United States Patent
Nakarai et al.

(10) Patent No.: US 8,885,680 B2
(45) Date of Patent: Nov. 11, 2014

(54) LASER APPARATUS, EXTREME ULTRAVIOLET LIGHT GENERATION SYSTEM, AND METHOD FOR GENERATING LASER BEAM

(75) Inventors: Hiroaki Nakarai, Hiratsuka (JP); Osamu Wakabayashi, Hiratsuka (JP); Hideo Hoshino, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 24 days.

(21) Appl. No.: 13/805,300

(22) PCT Filed: Mar. 5, 2012

(86) PCT No.: PCT/IB2012/000409
§ 371 (c)(1),
(2), (4) Date: Dec. 18, 2012

(87) PCT Pub. No.: WO2012/131452
PCT Pub. Date: Oct. 4, 2012

(65) Prior Publication Data
US 2013/0099140 A1    Apr. 25, 2013

(30) Foreign Application Priority Data

Mar. 30, 2011 (JP) ................ 2011-075700
Jan. 12, 2012 (JP) ................ 2012-004220

(51) Int. Cl.
  H01S 3/13     (2006.01)
  H01S 3/00     (2006.01)
  H01S 3/107    (2006.01)
  H05G 2/00     (2006.01)
  H01S 3/134    (2006.01)
  H01S 3/23     (2006.01)
  H01S 3/223    (2006.01)

(52) U.S. Cl.
  CPC .............. *H01S 3/0057* (2013.01); *H01S 3/235* (2013.01); *H01S 3/107* (2013.01); *H01S 3/2391* (2013.01); *H01S 3/2375* (2013.01); *H01S 3/1305* (2013.01); *H05G 2/008* (2013.01); *H01S 3/2316* (2013.01); *H01S 3/134* (2013.01); *H01S 3/2232* (2013.01)
  USPC ................... 372/29.014; 372/25; 372/29.016; 372/29.012

(58) Field of Classification Search
  CPC ... H01S 3/005; H01S 3/0057; H01S 3/06758; H01S 3/2325; H01S 3/10; H01S 3/2308; H01S 3/235; H01S 3/10046; H05G 2/003; B01D 59/34; H01J 27/02; H01J 49/126; B82Y 10/00
  USPC ................... 372/25, 29.016, 29.014, 29.012; 250/423 R, 423 P, 424, 425, 492.1, 250/492.2, 493.1, 504 R
  See application file for complete search history.

(56) References Cited

U.S. PATENT DOCUMENTS

| 4,757,268 | A  | 7/1988 | Abrams et al. |
| 6,421,363 | B1 | 7/2002 | Osinski et al. |

(Continued)

*Primary Examiner* — Colleen A Matthews
*Assistant Examiner* — Delma R Forde
(74) *Attorney, Agent, or Firm* — McDermott Will & Emery LLP

(57) ABSTRACT

A laser apparatus may include a seed laser device configured to output a pulse laser beam, a pulse energy adjusting unit configured to vary pulse energy of the pulse laser beam, at least one amplifier for amplifying the pulse laser beam, at least one power source for varying an excitation intensity in the at least one amplifier, and a controller configured to control the pulse energy adjusting unit on a pulse-to-pulse basis for the pulse laser beam passing therethrough and to control the at least one power source for a group of multiple pulses of the pulse laser beam.

13 Claims, 24 Drawing Sheets

(56) References Cited

U.S. PATENT DOCUMENTS

| | | |
|---|---|---|
| 7,006,547 B2 | 2/2006 | Steiger et al. |
| 8,399,870 B2 * | 3/2013 | Moriya et al. ............ 250/504 R |
| 8,476,609 B2 * | 7/2013 | Endo et al. ................ 250/504 R |
| 8,569,722 B2 * | 10/2013 | Kakizaki et al. .......... 250/504 R |
| 2002/0085606 A1 | 7/2002 | Ness et al. |
| 2003/0031216 A1 | 2/2003 | Fallon et al. |
| 2005/0254531 A1 | 11/2005 | Furukawa et al. |
| 2008/0095209 A1 | 4/2008 | Wakabayashi et al. |
| 2008/0149862 A1 * | 6/2008 | Hansson et al. .......... 250/504 R |
| 2010/0053633 A1 * | 3/2010 | Jansen .......................... 356/491 |
| 2010/0078580 A1 * | 4/2010 | Endo et al. ................ 250/504 R |
| 2010/0117009 A1 * | 5/2010 | Moriya et al. ............ 250/504 R |
| 2010/0118900 A1 | 5/2010 | Waarts et al. |
| 2010/0140514 A1 * | 6/2010 | Bykanov et al. .......... 250/504 R |
| 2010/0171049 A1 * | 7/2010 | Moriya et al. ............ 250/504 R |
| 2010/0193710 A1 * | 8/2010 | Wakabayashi et al. ... 250/504 R |
| 2010/0220756 A1 | 9/2010 | Krzysztof et al. |
| 2012/0217422 A1 * | 8/2012 | Yabu et al. ................. 250/504 R |
| 2012/0229889 A1 * | 9/2012 | Suganuma et al. ........... 359/344 |
| 2012/0243565 A1 * | 9/2012 | Onose et al. ..................... 372/27 |
| 2012/0292527 A1 * | 11/2012 | Fomenkov et al. ....... 250/432 R |
| 2012/0307851 A1 * | 12/2012 | Hori et al. ....................... 372/27 |
| 2013/0032735 A1 * | 2/2013 | Nowak et al. ............. 250/504 R |
| 2013/0051412 A1 * | 2/2013 | Miyao et al. .................... 372/31 |
| 2013/0114215 A1 * | 5/2013 | Kawasuji et al. ............. 361/728 |
| 2013/0119232 A1 * | 5/2013 | Moriya et al. ............. 250/201.1 |
| 2013/0148674 A1 * | 6/2013 | Nowak et al. .................... 372/26 |
| 2013/0153794 A1 * | 6/2013 | Wakabayashi ............ 250/504 R |
| 2013/0187065 A1 * | 7/2013 | Moriya et al. ............. 250/504 R |
| 2013/0315272 A1 * | 11/2013 | Nowak et al. ............. 372/38.07 |
| 2014/0034852 A1 * | 2/2014 | Kakizaki et al. .......... 250/504 R |
| 2014/0098830 A1 * | 4/2014 | Yabu et al. ....................... 372/30 |

* cited by examiner

LASER APPARATUS, EXTREME ULTRAVIOLET LIGHT GENERATION SYSTEM, AND METHOD FOR GENERATING LASER BEAM

CROSS-REFERENCE TO RELATED APPLICATIONS

The present application claims priority from Japanese Patent Application No. 2011-075700 filed Mar. 30, 2011, and Japanese Patent Application No. 2012-004220 filed Jan. 12, 2012.

BACKGROUND

1. Technical Field

This disclosure relates to a laser apparatus, an extreme ultraviolet (EUV) light generation system, and a method for generating a laser beam.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication at 32 nm or less, for example, an exposure apparatus is expected to be developed, in which an apparatus for generating extreme ultraviolet light at a wavelength of approximately 13 nm is combined with a reduced projection reflective optical system.

Three kinds of apparatuses for generating EUV light are generally known, which include a Laser Produced Plasma (LPP) type apparatus in which plasma generated by irradiating a target material with a laser beam is used, a Discharge Produced Plasma (DPP) type apparatus in which plasma generated by electric discharge is used, and a Synchrotron Radiation (SR) type apparatus in which orbital radiation is used.

SUMMARY

A laser apparatus according to one aspect of this disclosure may include: a seed laser device configured to output a pulse laser beam; a pulse energy adjusting unit configured to vary pulse energy of the pulse laser beam; at least one amplifier for amplifying the pulse laser beam; at least one power source for varying an excitation intensity in the at least one amplifier; and a controller configured to control the pulse energy adjusting unit on a pulse-to-pulse basis for the pulse laser beam passing therethrough and to control the at least one power source for a group of multiple pulses of the pulse laser beam.

An extreme ultraviolet light generation system according to another aspect of this disclosure may include: a laser apparatus including a seed laser device configured to output a pulse laser beam, a pulse energy adjusting unit configured to vary pulse energy of the pulse laser beam, at least one amplifier for amplifying the pulse laser beam, at least one power source for varying an excitation intensity in the at least one amplifier, and a controller configured to control the pulse energy adjusting unit on a pulse-to-pulse basis for the pulse laser beam passing therethrough and to control the at least one power source for a group of multiple pulses of the pulse laser beam; a chamber; a target supply unit mounted on the chamber and configured to supply a target material into the chamber; a focusing optical element for focusing a pulse laser beam from the laser apparatus in a predetermined region inside the chamber.

A method according to yet another aspect of this disclosure for generating a laser beam in a laser apparatus which includes a seed laser device, a pulse energy adjusting unit, at least one amplifier, and at least one power source may include: controlling the pulse energy adjusting unit configured to vary pulse energy of a pulse laser beam on a pulse-to-pulse basis for the pulse laser beam from the seed laser device; and controlling the at least one power source configured to vary an excitation intensity in the at least one amplifier for a group of multiple pulses of the pulse laser beam.

BRIEF DESCRIPTION OF THE DRAWINGS

Hereinafter, selected embodiments of this disclosure will be described with reference to the accompanying drawings.

DESCRIPTION OF PREFERRED EMBODIMENTS

Figure 1:
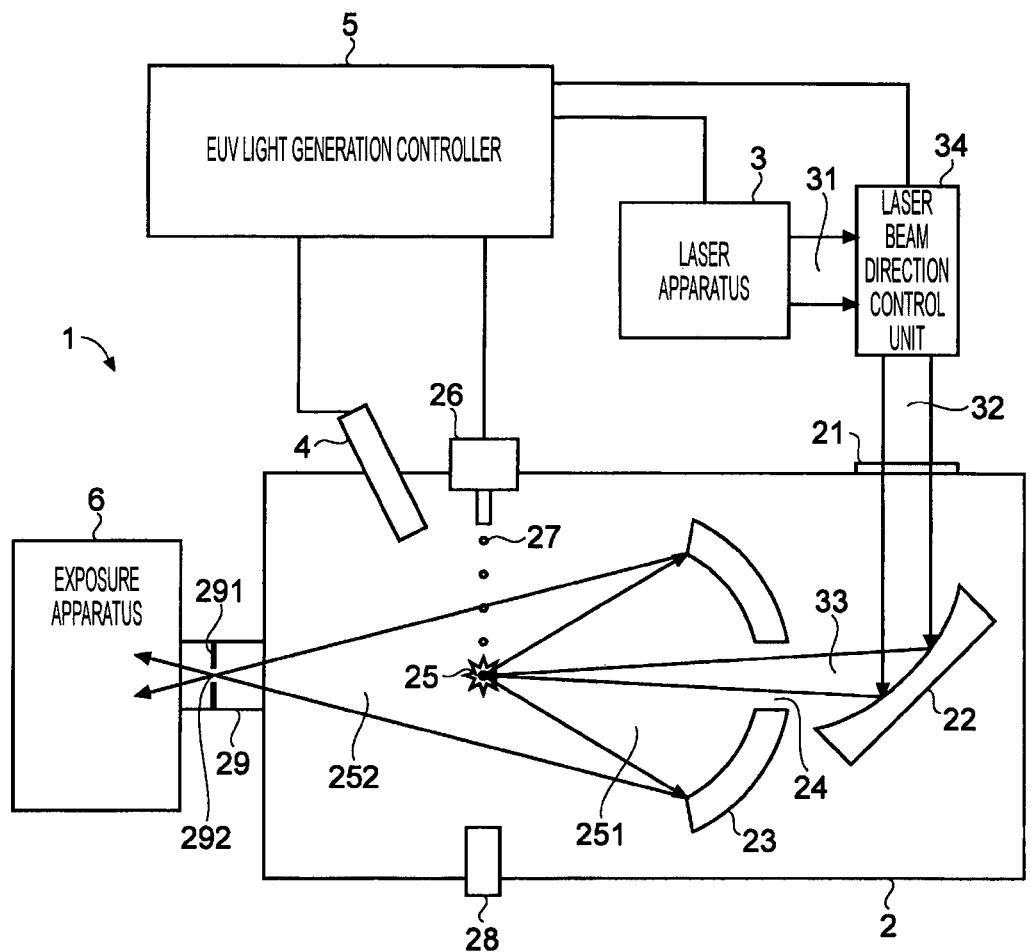
FIG. 1 schematically illustrates the configuration of an exemplary LPP type EUV light generation system.

Hereinafter, selected embodiments of this disclosure will be described in detail with reference to the accompanying drawings. The embodiments to be described below are merely illustrative in nature and do not limit the scope of this disclosure. Further, the configuration(s) and operation(s) described in each embodiment are not all essential in implementing this disclosure. Note that like elements are referenced by like reference numerals and characters, and duplicate descriptions thereof will be omitted. The embodiments of this disclosure will be discussed following the table of contents below.

Contents
1. Overview
2. Terms
3. Extreme Ultraviolet Light Generation System
3.1 Configuration
3.2 Operation
3.3 Short-Term Pulse Energy Control and Mid-to-Long-Term Pulse Energy Control
4. Control of Laser Apparatus
4.1 Embodiment Including Control of Optical Shutter (First Embodiment)
4.1.1 Configuration
4.1.2 Operation
4.1.3 Effect
4.1.4 Control Flow
4.1.4.1 Overall Flow
4.1.4.2 Initialization Routine
4.1.4.3 Control Voltage Value Calculation Routine
4.1.4.4 Seed Pulse Laser Beam Output Control Routine
4.1.4.5 Excitation Intensity Control Routine
4.1.4.5.1 First Example
4.1.4.5.2 Second Example
4.1.4.5.3 Third Example
4.1.4.6 Gain Calculation Routine
4.2 Embodiment Including Control of Output Energy of Master Oscillator (Second Embodiment)
4.3 Embodiment Including Multiple Master Oscillators (Third Embodiment)
4.3.1 Configuration
4.3.2 Operation
4.3.3 Effect
4.4 Amplification Unit (Fourth Embodiment)
4.4.1 Configuration
4.4.2 Operation
4.4.3 Effect
4.4.4 Control Flow
5. Controlling Optical Shutter
5.1 Optical Shutter
5.1.1 Combination of Pockels Cell and Polarizers
6. Controlling Excitation Intensity in Amplifier
6.1 PWM Method
6.2 Potential Control Method
7. Extreme Ultraviolet Light Generation System Including Laser Apparatus (Fifth Embodiment)
7.1 Configuration
7.2 Operation
7.3 Control Flow
7.3.1 Overall Flow
7.3.2 Initialization Routine
7.3.3 Energy Instruction Value Calculation Routine
7.3.4 EUV Light Generation Control Routine
8. Supplementary Descriptions
8.1 Variation of Optical Shutter
8.2 Regenerative Amplifier
8.3 Beam Path Adjusting Unit
8.4 Multi-line Amplification 1. Overview According to one or more of the embodiments of this disclosure, both short-term pulse energy control and mid-to-long-term pulse energy control can be achieved. In the short-term pulse energy control, energy of a pulse laser beam entering an amplifier may be controlled on a pulse-to-pulse basis (pulse-to-pulse energy control). Meanwhile, in the mid-to-long-term pulse energy control, excitation energy to be supplied to an amplifier may be controlled in a mid-to-long term (excitation energy control).

2. Terms

Terms used in this disclosure may be interpreted as follows. The term "plasma generation region" may refer to a three-dimensional space in which plasma is to be generated. The term "burst operation" may refer to an operation mode or state in which a pulse laser beam or pulse EUV light is outputted at a predetermined repetition rate during a predetermined period and the pulse laser beam or the pulsed EUV light is not outputted outside of the predetermined period. In a beam path of a laser beam, a direction or side closer to the seed laser device is referred to as "upstream," and a direction or side closer to the plasma generation region is referred to as "downstream." The "predetermined repetition rate" does not have to be a constant repetition rate but may, in some examples, be a substantially constant repetition rate.

In this disclosure, Z-direction is defined as the direction into which the laser beam travels. X-direction is perpendicular to Z-direction, and Y-direction is perpendicular to both Z-direction and X-direction. Accordingly, X-direction and Y-direction may be rotated as the direction into which the laser beam travels is changed. For example, when the direction into which the laser beam travels (Z-direction) changes within X-Z plane, X-direction is rotated in accordance with the change in Z-direction, but Y-direction remains unchanged. Similarly, when the direction into which the laser beam travels (Z-direction) changes within Y-Z plane, Y-direction is rotated in accordance with the change in Z-direction, but X-direction remains unchanged. In order to facilitate understanding, the coordinate systems for the laser beam incident on the uppermost stream side optical element of the optical elements depicted in a given drawing is shown appropriately in selected drawings.

In an optical element, the "plane of incidence" refers to a plane perpendicular to the surface on which the laser beam is incident and containing the beam axis of the laser beam incident thereon. A polarization component perpendicular to the plane of incidence is referred to as the "S-polarization component," and a polarization component parallel to the plane of incidence is referred to as the "P-polarization component."

3. Extreme Ultraviolet Light Generation System
3.1 Configuration

FIG. 1 schematically illustrates the configuration of an exemplary laser produced plasma (LPP) type EUV light generation system. An EUV light generation system 1 may include at least one laser apparatus 3. As illustrated in FIG. 1, and described in more detail below, the EUV light generation system 1 may include a chamber 2, a target supply unit (e.g., target generator 26), and so forth. The chamber 2 may be airtightly sealed. The target supply unit 26 may be mounted to the chamber 2 so as to pass through the wall of the chamber 2, for example. A target material to be supplied by the target supply unit 26 may include, but is not limited to, tin, terbium, gadolinium, lithium, xenon, or any combination, alloy, or mixture thereof.

The chamber 2 may have at least one through-hole formed in the wall thereof. The through-hole may be covered with a window 21, and a pulse laser beam 32 may travel through the window 21 into the chamber 2. An EUV collector mirror 23 having a spheroidal surface may be provided, for example, inside the chamber 2. The EUV collector mirror 23 may have a multi-layered reflective film formed on the spheroidal surface thereof, and the reflective film may include, for example, molybdenum and silicon that is laminated in alternate layers. The EUV collector mirror 23 may have first and second foci, and may preferably be positioned such that the first focus lies in a plasma generation region 25 and the second focus lies in an intermediate focus (IF) region 292 defined by the specification of an exposure apparatus 6. The EUV collector mirror 23 may have a through-hole 24 formed at the center thereof, and a pulse laser beam 33 may travel through the through-hole 24.

Still referring to FIG. 1, the EUV light generation system 1 may include an EUV light generation controller 5 and a target sensor 4. The target sensor 4 may have an imaging function and may detect at least one of the presence, trajectory, and position of a target.

The EUV light generation system 1 may further include a connection part 29 for allowing the interior of the chamber 2 and the interior of the exposure apparatus 6 to be in communication with each other. A wall 291 having an aperture may be provided inside the connection part 29. The wall 291 may be positioned such that the second focus of the EUV collector mirror 23 lies in the aperture formed in the wall 291.

The EUV light generation system 1 may further include a laser beam direction control unit 34, a laser beam focusing mirror 22, and a target collector 28 for collecting a target 27. The laser beam direction control unit 34 may include an optical element for defining the direction in which the laser beam travels and an actuator for adjusting the position and the orientation (or posture) of the optical element.

3.2 Operation

With continued reference to FIG. 1, a pulse laser beam 31 outputted from the laser apparatus 3 may pass through the laser beam direction control unit 34 and outputted therefrom as a pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target generator 26 may be configured to output the targets 27 toward the plasma generation region 25 inside the chamber 2. The target 27 may be irradiated with at least one pulse of the pulse laser beam 33. The target 27, which has been irradiated with the pulse laser beam 33, may be turned into plasma, and rays of light 251 including EUV light 252 may be emitted from the plasma. The EUV light 252 may be reflected selectively by the EUV collector mirror 23. The EUV light 252 reflected by the EUV collector mirror 23 may travel through the intermediate focus region 292 and be outputted to the exposure apparatus 6. The target 27 may be irradiated with multiple pulses included in the pulse laser beam 33.

The EUV light generation controller 5 may integrally control the EUV light generation system 1. The EUV light generation controller 5 may be configured to process image data of a droplet (i.e., target 27) captured by the target sensor 4. Further, the EUV light generation controller 5 may control at least one of the timing at which the target 27 is outputted and the direction into which the target 27 is outputted (e.g., the timing at which and/or direction in which the target is outputted from target generator 26). Furthermore, the EUV light generation controller 5 may control, for example, at least one of the timing at which the laser apparatus 3 oscillates (e.g., by controlling laser apparatus 3), the direction in which the pulse laser beam 31 travels (e.g., by controlling laser beam direction control unit 34), and the position at which the pulse laser beam 33 is focused (e.g., by controlling laser apparatus 3, laser beam direction control unit 34, or the like). It will be appreciated that the various controls mentioned above are merely examples, and other controls may be added as necessary.

3.3 Short-Term Pulse Energy Control and Mid-to-Long-Term Pulse Energy Control

The EUV light generation system 1 may be configured to output the EUV light 252 in pulses at a predetermined repetition rate. The outputted EUV light 252 may be used in the exposure apparatus 6 for an exposure of a photoresist on a wafer or the like.

When a circuit pattern is formed on the photoresist, the exposure amount may preferably be controlled with high precision. In the EUV light generation system 1 including the laser apparatus 3, it is preferable that the pulse energy of the pulse laser beam 31 outputted from the laser apparatus 3 can be controlled on a pulse-to-pulse basis (pulse-to-pulse energy control). When the pulse energy of the EUV light 252 can be controlled on a pulse-to-pulse basis, the exposure amount may be controlled with high precision.

In the pulse-to-pulse energy control of the pulse laser beam 31, the pulse energy of the pulse laser beam 31 may need to be controlled within a wide dynamic range. Here, the dynamic range may be a range within which the pulse energy can be controlled.

One case where such a wide dynamic range is required is when the reflectivity of the EUV collector mirror 23 provided inside the chamber 2 is decreased due to debris or the like deposited on the reflective surface of the EUV collector mirror 23. When the reflectivity of the EUV collector mirror 23 is decreased, the pulse energy of the EUV light 252 reflected by the EUV collector mirror 23 to be inputted into the exposure apparatus 6 may also decrease. In such a case, in order to retain the pulse energy of the EUV light 252 to be inputted into the exposure apparatus 6 at a predetermined level, the pulse energy of the pulse laser beam 31 outputted from the laser apparatus 3 may need to be increased. With this, the pulse energy of the EUV light 252 emitted in the plasma generation region 25 may be increased, and in turn the pulse energy of the EUV light 252 reflected by the EUV collector mirror 23 to be inputted into the exposure apparatus 6 may be compensated.

Further, differences in exposure sensitivity of photoresists may also require the pulse energy of the EUV light 252 to be controlled in a wide dynamic range. When a photoresist having relatively high sensitivity to the EUV light 252 is used, for example, the pulse energy of the EUV light 252 may need to be decreased. In that case, the pulse energy of the pulse laser beam 31 outputted from the laser apparatus 3 may also need to be decreased. In consideration of the above issues, the following embodiments are disclosed herein.

4. Control of Laser Apparatus 4.1 Embodiment Including Control of Optical Shutter (First Embodiment)

In a laser apparatus 3A of a first embodiment, the pulse-to-pulse energy control may be carried out by using an optical shutter (pulse energy adjusting unit).

4.1.1 Configuration

Figure 2:
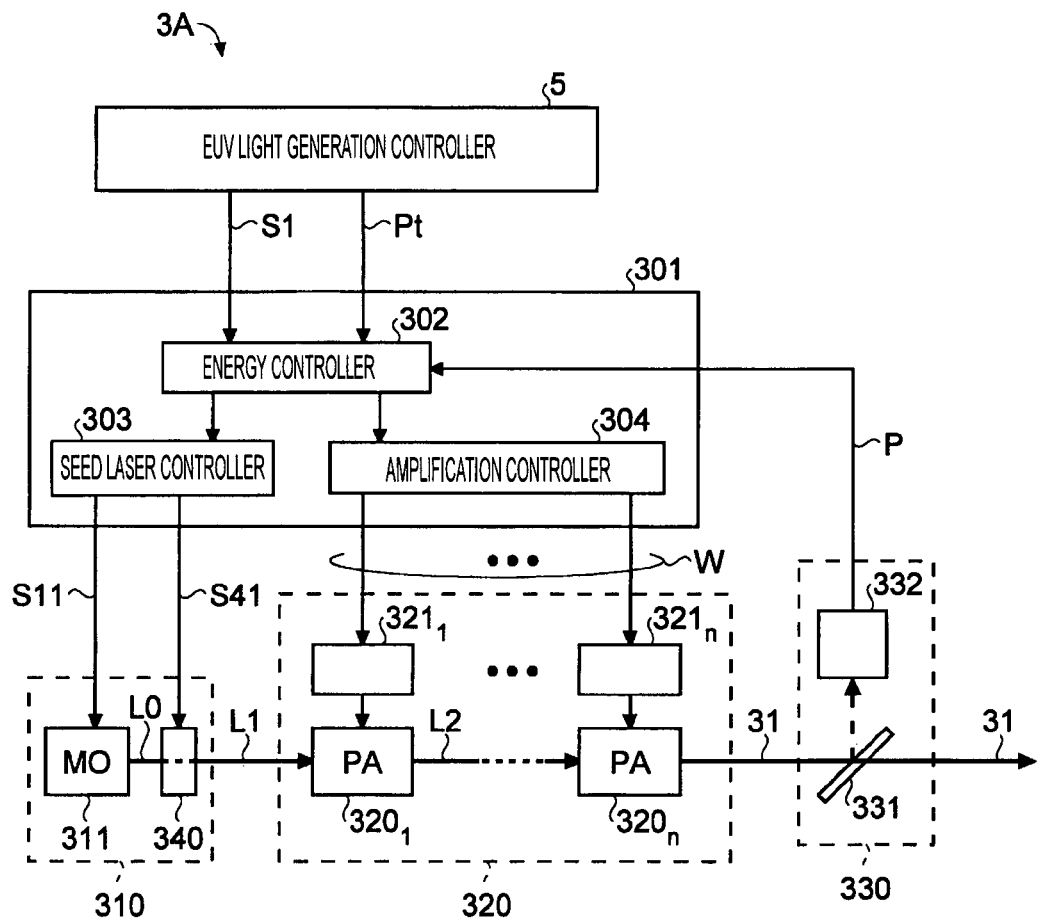
FIG. 2 schematically illustrates the configuration of a laser apparatus according to a first embodiment of this disclosure.

FIG. 2 schematically illustrates the configuration of the laser apparatus 3A. As shown in FIG. 2, the laser apparatus 3A may include a laser controller 301, a seed laser device 310, an amplification unit 320, and an energy monitor 330.

The laser controller 301 may include an energy controller 302, a seed laser controller 303, and an amplification controller 304. The seed laser device 310 may include a master oscillator 311 and an optical shutter 340. The optical shutter 340 may be provided between the master oscillator 311 and the amplification unit 320.

The amplification unit 320 may be provided downstream from the seed laser device 310. The amplification unit 320 may include amplifiers $320_1$ through $320_n$ and RF power sources $321_1$ through $321_n$ connected to the respective amplifiers $320_1$ through $320_n$.

The laser controller 301 may be connected to an external device, such as the EUV light generation controller 5. The laser controller 301 may further be connected to the seed laser device 310, the amplification unit 320, and the energy monitor 330. The energy controller 302 may be connected to the seed laser controller 303 and the amplification controller 304.

The seed laser controller 303 may be connected to the master oscillator 311 and the optical shutter 340. The amplification controller 304 may be connected to the RF power sources $321_1$ through $321_n$.

The energy monitor 330 may include a beam splitter 331 and an optical sensor 332. The energy monitor 330 may be provided downstream from the downmost amplifier $320_n$ of the amplification unit 320.

4.1.2 Operation

With reference to FIG. 2, the laser controller 301 may receive an energy instruction value Pt and a trigger signal S1 from the EUV light generation controller 5. The energy instruction value Pt may indicate pulse energy required for the pulse laser beam 31 in order to obtain the EUV light 252 having pulse energy required by the exposure apparatus 6. The trigger signal S1 may serve as a reference for a timing at which and a cycle in which the pulse laser beam 31 is to be outputted.

The energy controller 302 may be configured to control the seed laser controller 303 based on the trigger signal S1 from the EUV light generation controller 5. The seed laser controller 303 may be configured to send an oscillation signal S11 to the master oscillator 311 under the control of the energy controller 302. The master oscillator 311 may be configured to oscillate in accordance with the oscillation signal S11. With this, a seed pulse laser beam L0 may be outputted from the master oscillator 311 at a predetermined repetition rate.

Further, the seed laser controller 303 may include an internal trigger generator configured to output internal trigger signals at a predetermined repetition rate. The seed laser controller 303 may send the oscillation signal S11 to the master oscillator 311 in accordance with the internal trigger signal. Then, the master oscillator 311 may oscillate in accordance with the oscillation signal S11. With this, the seed pulse laser beam L0 may be outputted from the master oscillator 311 at a predetermined repetition rate.

The beam splitter 331 of the energy monitor 330 may be positioned such that the pulse laser beam 31 from the amplification unit 320 is incident on the beam splitter 331. The pulse laser beam 31 incident on the beam splitter 331 may be split thereby, and a split component of the pulse laser beam 31 may enter the optical sensor 332. The optical sensor 332 may be configured to monitor the pulse energy of the split component of the pulse laser beam 31. A value (detected energy value P) of the pulse energy detected by the optical sensor 332 may be sent to the energy controller 302.

The energy controller 302 may be configured to control the seed laser controller 303 based, for example, on the trigger signal S1, the energy instruction value Pt, and the detected energy value P. Alternatively, the energy controller 302 may be configured to control the seed laser controller 303 based, for example, on the internal trigger signal and an energy instruction initial value P0. The seed laser controller 303 may be configured to control, on a pulse-to-pulse basis, transmittance of the seed pulse laser beam L0 through the optical shutter 340 under the control of the energy controller 302. With this, the pulse energy of a seed pulse laser beam L1 outputted from the seed laser device 310 may be controlled on a pulse-to-pulse basis. In this way, the optical shutter 340 may function as a pulse energy adjusting unit for varying the pulse energy of the seed pulse laser beam L1.

Further, as the mid-to-long-term pulse energy control, the energy controller 302 may be configured to control the amplification controller 304 based, for example, on the trigger signal S1, the energy instruction value Pt, and the detected energy value P. Alternatively, the energy controller 302 may be configured to control the amplification controller 304 based, for example, on the internal trigger signal and the energy instruction initial value P0. The amplification controller 304 may be configured to control the excitation intensity in the amplifiers $320_1$ through $320_n$ under the control of the energy controller 302. The excitation intensity in the amplifiers $320_1$ through $320_n$ may be controlled through control signals sent to the respective RF power sources $321_1$ through $321_n$ from the amplification controller 304.

Here, the case where the laser controller 301 includes the energy controller 302, the seed laser controller 303, and the amplification controller 304 has been illustrated. However, this disclosure is not limited thereto. For example, the laser controller may be constituted by a single controller.

4.1.3 Effect

With the above configuration and operation, both the pulse-to-pulse energy control (short-term pulse energy control) and the excitation energy control (mid-to-long-term pulse energy control) may be achieved. With the pulse-to-pulse energy control, the pulse energy of the seed pulse laser beam L1 entering the amplification unit 320 may be controlled on a pulse-to-pulse basis. With the excitation energy control, the pulse energy of the laser beam L2 (and the pulse laser beam 31) may be controlled over a mid-to-long term. As a result, compared to the case where only the pulse-to-pulse energy control is employed, the pulse energy may be controlled in a wider dynamic range.

4.1.4 Control Flow

Figure 3:
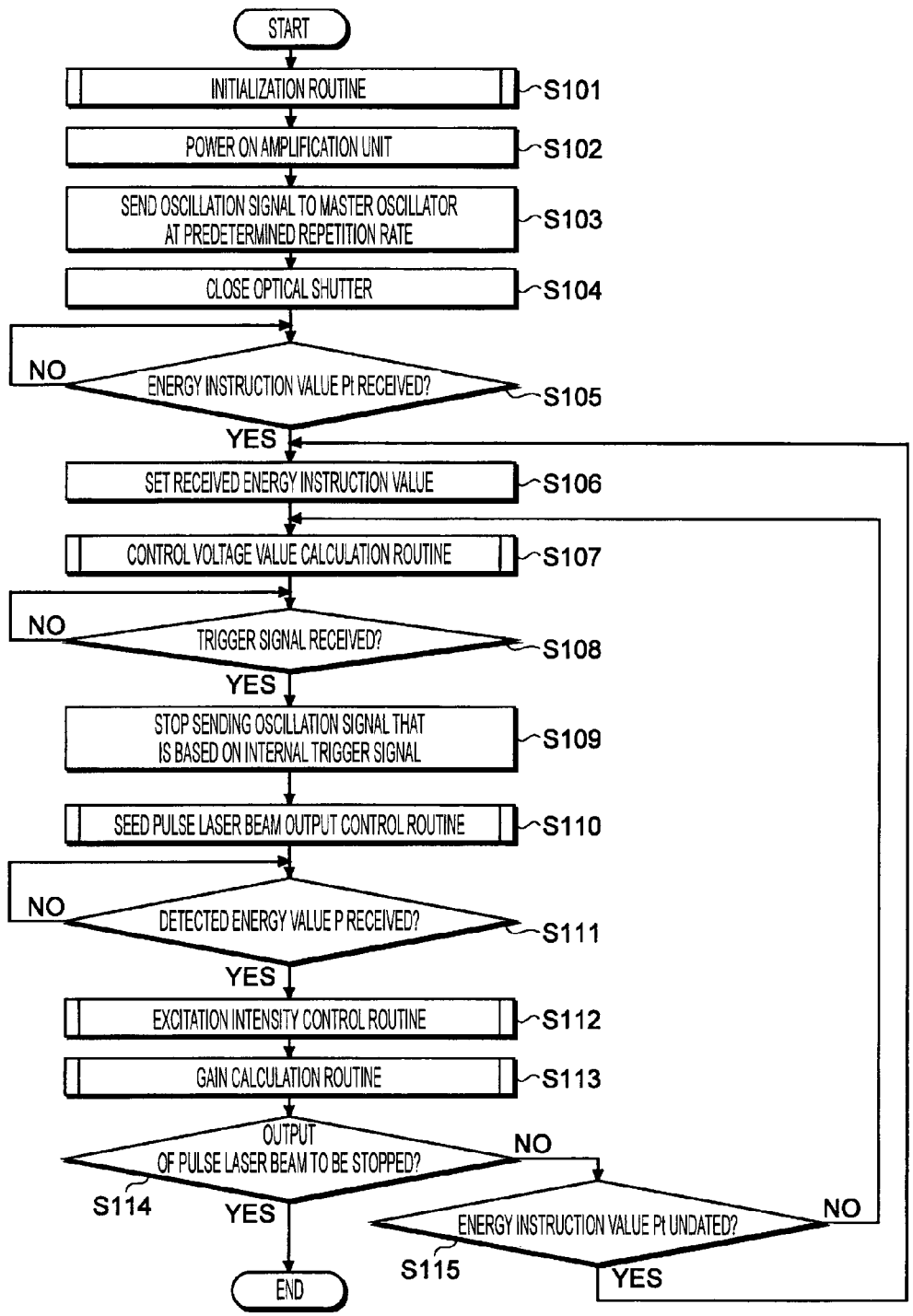
FIG. 3 shows the overall operation of the laser apparatus shown in FIG. 2.
Figure 4:
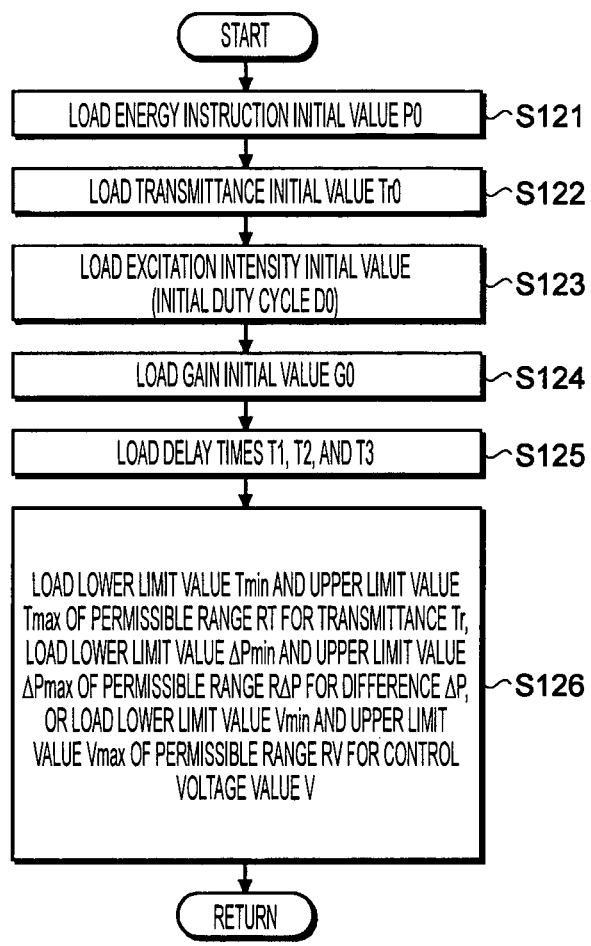
FIG. 4 shows an example of an initialization routine in Step S101 of FIG. 3.
Figure 5:
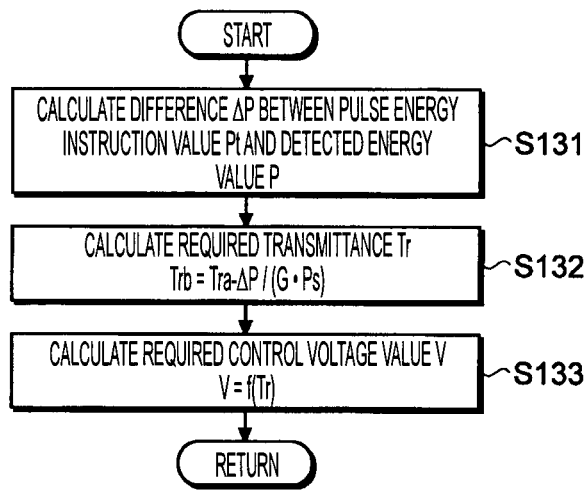
FIG. 5 shows an example of a control voltage value calculation routine in Step S107 of FIG. 3.
Figure 6:
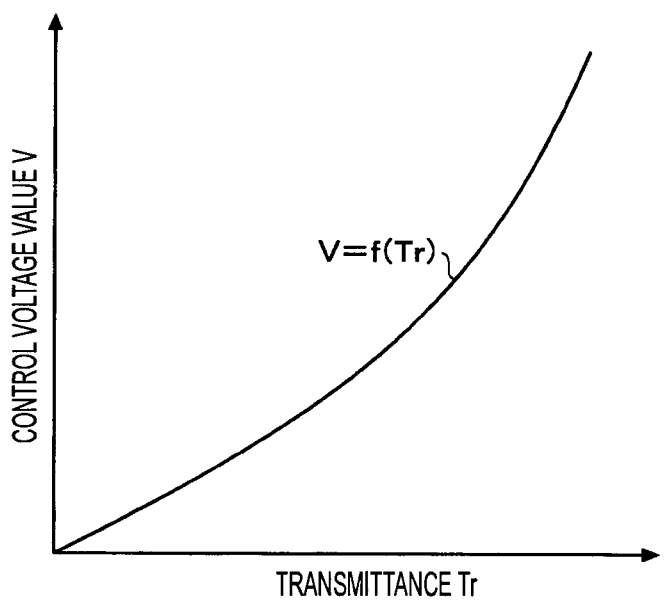
FIG. 6 shows an example of the relationship between the control voltage values and corresponding transmittances according to the first embodiment.
Figure 7:
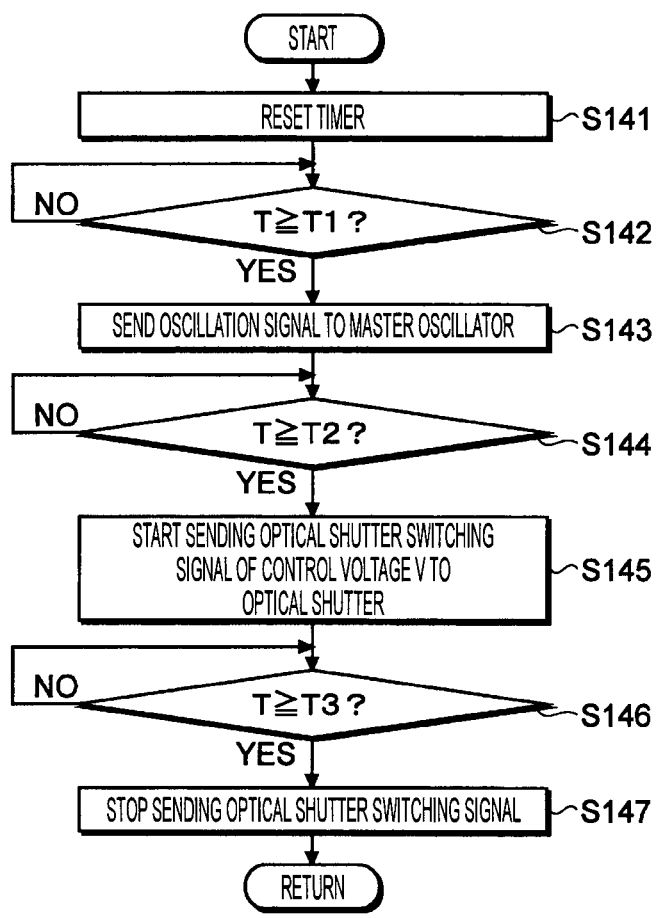
FIG. 7 shows an example of a seed pulse laser beam output control routine in Step S110 of FIG. 3.
Figure 8:
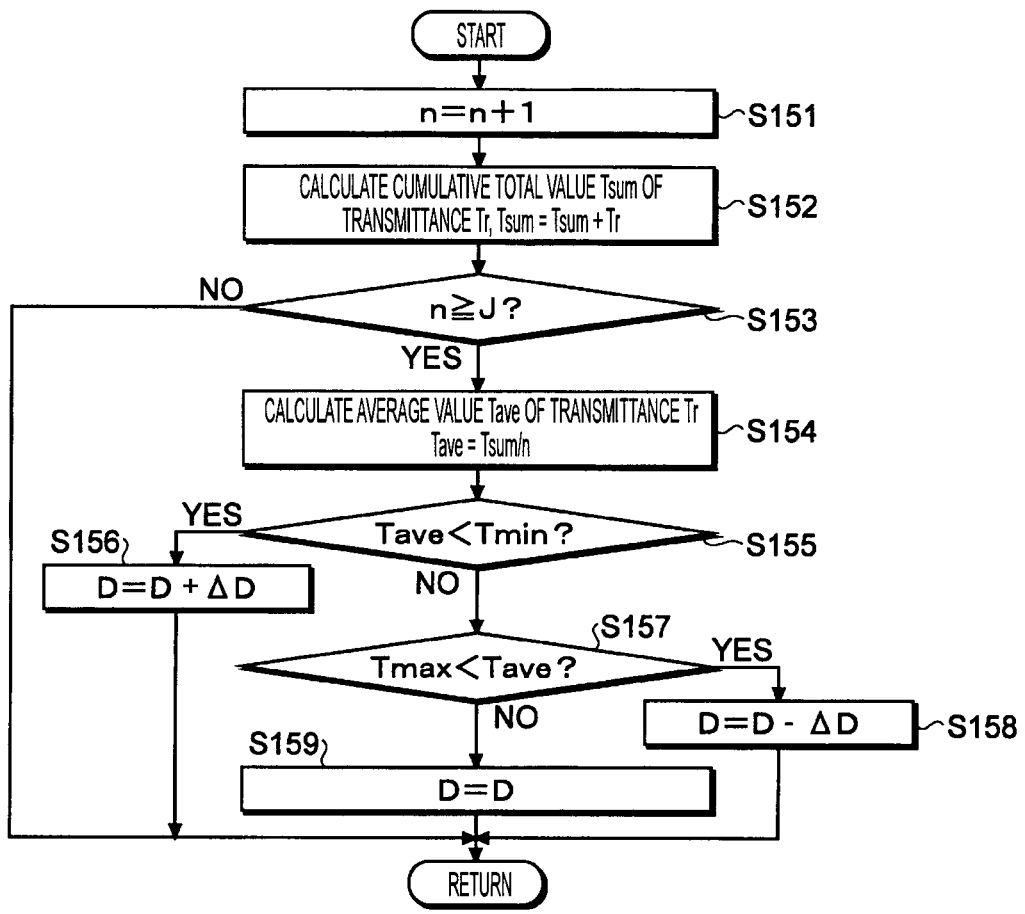
FIG. 8 shows a first example of an excitation intensity control routine in Step S112 of FIG. 3.
Figure 9:
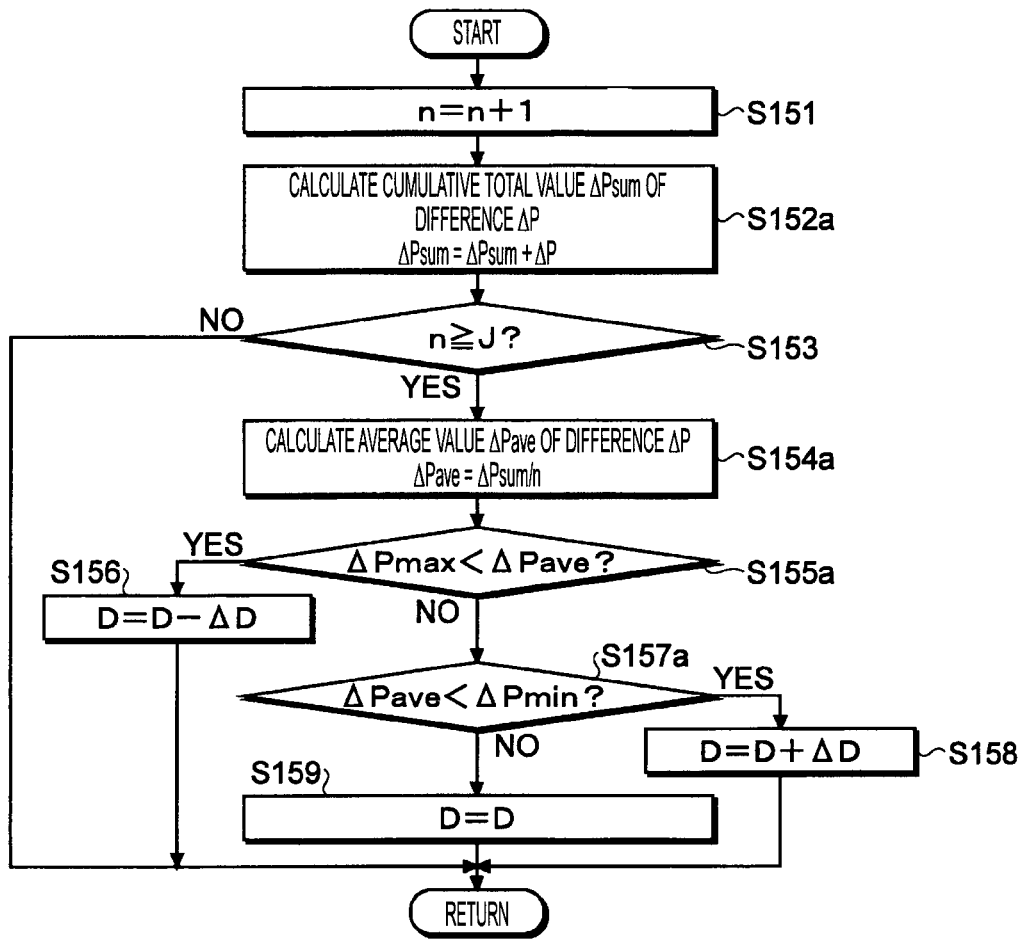
FIG. 9 shows a second example of the excitation intensity control routine in Step S112 of FIG. 3.
Figure 10:
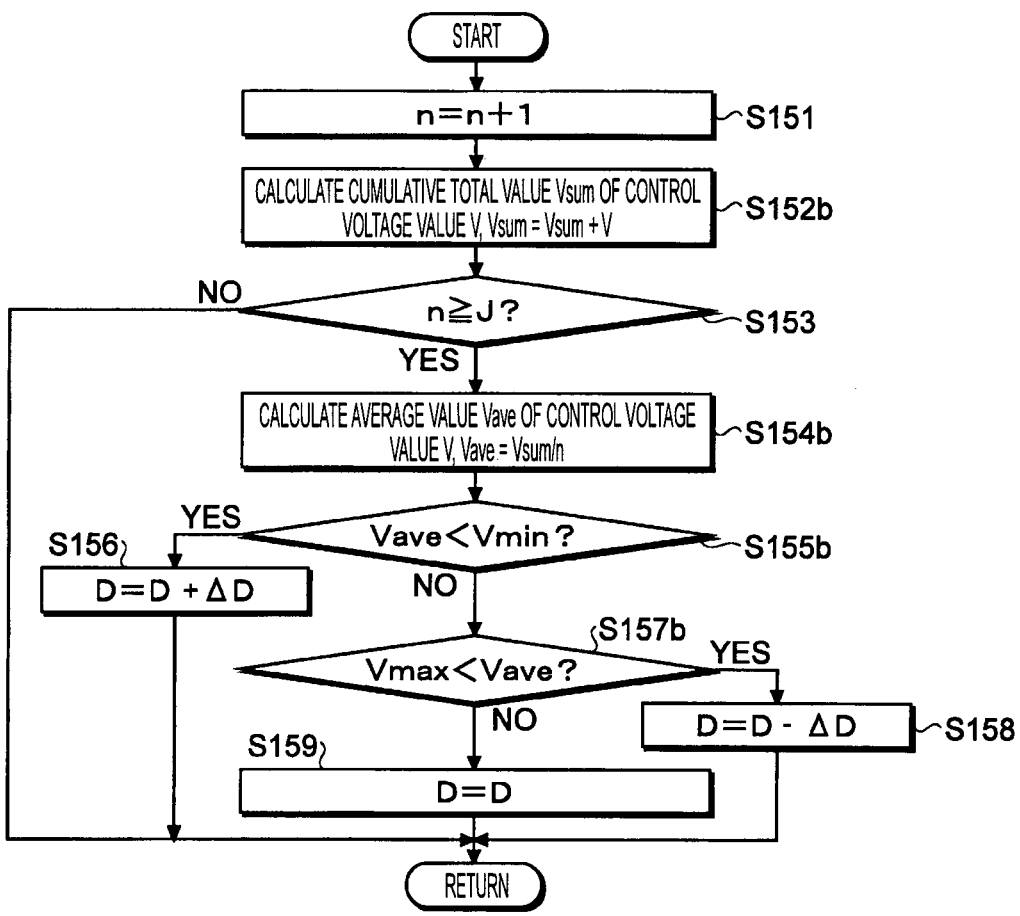
FIG. 10 shows a third example of the excitation intensity control routine in Step S112 of FIG. 3.
Figure 11:
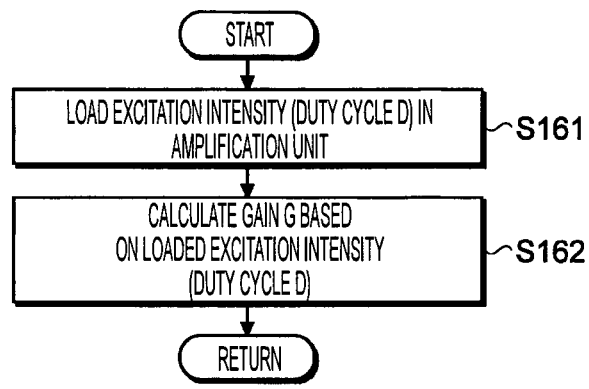
FIG. 11 shows an example of a gain calculation routine in Step S113 of FIG. 3.

The operation of the laser apparatus 3A will be described in detail with reference to the drawings. FIG. 3 shows the overall operation of the laser apparatus 3A. FIG. 4 shows an example of an initialization routine in Step S101 of FIG. 3. FIG. 5 shows an example of a control voltage value calculation routine in Step S107 of FIG. 3. FIG. 6 shows an example of the relationship between the control voltage values and corresponding transmittances according to the first embodiment. FIG. 7 shows an example of a seed pulse laser beam output control routine in Step S110 of FIG. 3. FIG. 8 shows a first example of an excitation intensity control routine in Step S112 of FIG. 3. FIG. 9 shows a second example of the excitation intensity control routine in Step S112 of FIG. 3. FIG. 10 shows a third example of the excitation intensity control routine in Step S112 of FIG. 3. FIG. 11 shows an example of a gain calculation routine in Step S113 of FIG. 3. The description to follow will be given with a focus on the operation of the laser controller 301.

4.1.4.1 Overall Flow

With reference to FIGS. 2 and 3, the laser controller 301 may first execute the initialization routine for setting an initial value in each parameter of this operation (Step S101). Then, the laser controller 301 may turn on the RF power sources $321_1$ through $321_n$ (Step S102). With this, the amplification unit 320 may be started. The laser controller 301 may then send the oscillation signal S11 to the master oscillator 311 in accordance with the internal triggers outputted at a predetermined repetition rate from the internal trigger generator (Step S103). With this, the master oscillator 311 may oscillate on idle at a predetermined repetition rate. Here, the laser controller 301 may be configured to retain the optical shutter 340 being closed (Step S104). With this, the seed pulse laser beam L0 from the master oscillator 311 may be blocked by the optical shutter 340. Here, the sequence of Steps 103 and 104 can be switched.

Then, the laser controller 301 may stand by until it receives the energy instruction value Pt from the EUV light generation controller 5 (Step S105; NO). Upon receiving the energy instruction value Pt (Step S105; YES), the laser controller 301 may set the received energy instruction value Pt as a target energy instruction value Pt (Step S106). Subsequently, the laser controller 301 may execute the control voltage value calculation routine for calculating a control voltage value V of control voltage to be applied to the optical shutter 340 based on the energy instruction value Pt (Step S107).

The laser controller 301 may then stand by until it receives the trigger signal S1 from the EUV light generation controller 5 (Step S108; NO). Here, the EUV light generation controller 5 may send the trigger signals 51 to the laser controller 301 at a predetermined repetition rate. While the laser controller 301 does not receive the trigger signal S1, the laser controller 301 may allow the master oscillator 311 to continue oscillating on idle based on the internal trigger signals. Upon receiving the trigger signal S1 (Step S108; YES), the laser controller 301 may stop sending the oscillation signal S11, which is based on the internal trigger signal, to the master oscillator 311 (Step S109). With this, the master oscillator 311 may stop oscillating on idle. Subsequently, the laser controller 301 may execute the seed pulse laser beam output control routine for causing the seed laser device 310 to output the seed pulse laser beam L0 (Step S110).

Then, the laser controller 301 may stand by until it receives the detected energy value P of the pulse laser beam 31 from the energy monitor 330 (Step S111; NO). Upon receiving the detected energy value P (Step S111; YES), the laser controller 301 may execute the excitation intensity control routine for controlling the excitation intensity in the amplifiers $320_1$ through $320_n$ (Step S112). Then, the laser controller 301 may execute the gain calculation routine for calculating the gain in the amplification unit 320 (Step S113).

Thereafter, the laser controller 301 may determine whether or not the output of the pulse laser beam 31 is to be stopped (Step S114). This determination may be made based on, for example, an instruction from the EUV light generation controller 5. When the output of the pulse laser beam 31 is to be stopped (Step S114; YES), the laser controller 301 may terminate the operation shown in FIG. 3. On the other hand, when the output of the pulse laser beam 31 is to be continued (Step S114; NO), the laser controller 301 may determine whether or not it has received an updated energy instruction value Pt from the EUV light generation controller 5 (Step S115). When the laser controller 301 has received the updated energy instruction value Pt (Step S115; YES), the laser controller 301 may return to Step S106 and repeat the subsequent steps. At the same time, the EUV light generation controller 5 may stop sending the trigger signal S1 to the laser controller 301. In that case, the laser controller 301 may control the master oscillator 310 to start oscillating on idle based on the internal trigger signal. On the other hand, when the laser controller 301 has not received the updated energy instruction value Pt (Step S115; NO), the laser controller 301 may return to Step S107 and repeat the subsequent steps. At the same time, the EUV light generation controller 5 may stop sending the trigger signal S1 to the laser controller 301. In that case, the laser controller 301 may control the master oscillator 310 to start oscillating on idle based on the internal trigger signal.

4.1.4.2 Initialization Routine

An example of the initialization routine in Step S101 of FIG. 3 will now be discussed. With reference to FIG. 4 and continued reference to FIG. 2, the laser controller 301 may load an energy instruction initial value P0, which is an initial value of the energy instruction value Pt (Step S121). The laser controller 301 may then load a transmittance initial value Tr0, which is an initial value of transmittance Tr to be set to the optical shutter 340 (Step S122). The laser controller 301 may then load excitation intensity initial values (initial duty cycle D0), which are initial values of the excitation intensity to be set to the respective amplifiers $320_1$ through $320_n$ (Step S123). The laser controller 301 may then load a gain initial value G0, which is an initial value of a gain G of the amplification unit 320 (Step S124).

Subsequently, the laser controller 301 may load various delay times (Step S125). These delay times may include an oscillation delay time T1, a shutter open delay time T2, and a shutter close delay time T3. The oscillation delay time T1 may be a delay time set for an output of the oscillation signal S11 with respect to an input of the trigger signal S1. The shutter open delay time T2 may be a delay time set for the opening of the optical shutter 340 with respect to the input of the trigger signal S1. The shutter close delay time T3 may be a delay time set for the closing of the optical shutter 340 with respect to the input of the trigger signal S1.

Then, the laser controller 301 may load a lower limit value Tmin and an upper limit value Tmax of a permissible range RT for the transmittance Tr of the optical shutter 340 as a permissible range for the pulse laser beam 31 (Step S126). Alternatively, the laser controller 301 may load a lower limit value ΔPmin and an upper limit value ΔPmax of a permissible range RAP for a difference ΔP, which is a difference between the detected energy value P and the energy instruction value Pt, in Step S126. Further alternatively, the laser controller 301 may load a lower limit value Vmin and an upper limit value Vmax of a permissible range RV for the control voltage value V in Step S126. Here, the aforementioned various values may be loaded from a memory (not shown) or the like. Thereafter, the laser controller 301 may return to the operation shown in FIG. 3.

4.1.4.3 Control Voltage Value Calculation Routine

An example of the control voltage value calculation routine in Step S107 of FIG. 3 will now be discussed. With reference to FIG. 5 and continued reference to FIG. 2, the laser controller 301 may calculate the difference ΔP between the detected energy value P and the energy instruction value Pt (e.g., ΔP=Pt−P) (Step S131). When the control voltage value calculation routine is executed for the first time in this operation, the energy instruction initial value P0 may be used in place of the detected energy value P. Otherwise, the detected energy value P may have been obtained in Step S111 (see FIG. 3)

Then, the laser controller 301 may calculate the transmittance Tr required for the optical shutter 340, using the difference ΔP (Step S132). Required transmittance Trb may, for example, be obtained from Expressions (1) through (4) below.

$$Pa = G \cdot Ps \cdot Tra \quad (1)$$

$$Pb = G \cdot Ps \cdot Trb \quad (2)$$

$$\Delta P = Pa - Pb = G \cdot Ps \cdot (Tra - Trb) \quad (3)$$

$$Trb = Tra - \Delta P/(G \cdot Ps) \quad (4)$$

Here, Ps is the pulse energy of the seed pulse laser beam L0 from the master oscillator 311; Tra is the currently-set transmittance; and Trb is the required transmittance. Then, Pa and Pb are the pulse energy of the pulse laser beam having passed through the amplification unit 320 in the cases of Tra and Trb, respectively; and G is the gain.

Subsequently, the laser controller 301 may calculate the control voltage value V for satisfying the required transmittance Trb (Step S133). The transmittance Tr and the control voltage value V may, for example, have the relationship shown in FIG. 6. The control voltage value V for given transmittance Tr may be calculated using a function V=f(Tr), which may have been prepared in advance, or may be obtained from a data table or the like for managing the corresponding relationship between the control voltage value V and the transmittance Tr. Here, the function V=f(Tr) may be stored in a memory (not shown) or the like. The data table may also be held in a memory (not shown) or the like, and the laser controller 301 may refer thereto as appropriate. Thereafter, the laser controller 301 may return to the operation shown in FIG. 3.

4.1.4.4 Seed Pulse Laser Beam Output Control Routine

An example of the seed pulse laser beam output control routine in Step S110 of FIG. 3 will now be discussed. With reference to FIG. 7 and continued reference to FIG. 2, the laser controller 301 may reset a count value T of a timer (not shown) (Step S141). Here, the timer may start counting time immediately after it is reset.

Then, the laser controller 301 may stand by until the count value T of the timer reaches the oscillation delay time T1 loaded in Step S125 of FIG. 4 (Step S142; NO). When the count value T reaches the oscillation delay time T1 (Step S142; YES), the laser controller 301 may send the oscillation signal S11 to the master oscillator 311 (Step S143). With this, the master oscillator 311 may output the seed pulse laser beam L0. Here, what may be common to both the oscillation signal S11 of Step S143 and the oscillation signal S11 of Step S103 is that they are sent from the seed laser controller 303 to the master oscillator 311. However, they may differ in that the oscillation signal S11 of Step S143 is synchronized with the trigger signal S1, whereas the oscillation signal S11 of Step S103 is synchronized with the internal trigger signal generated by the internal trigger generator of the seed laser controller 303.

Then, the laser controller 301 may stand by until the count value T of the timer reaches the shutter open delay time T2 loaded in Step S125 of FIG. 4 (Step S144; NO). When the count value T reaches the shutter open delay time T2 (Step S144; YES), the laser controller 301 may start sending an optical shutter switching signal S41 to the optical shutter 340 for supplying the control voltage value V to the optical shutter 340 (Step S145). With this, the optical shutter 340 may be opened with the transmittance Tr corresponding to the control voltage value V.

Thereafter, the laser controller 301 may stand by until the count value T of the timer reaches the shutter close delay time T3 loaded in Step S125 of FIG. 4 (Step S146; NO). When the count value T reaches the shutter close delay time T3 (Step S146; YES), the laser controller 301 may stop sending the optical shutter switching signal S41 to the optical shutter 340 (Step S147). With this, the optical shutter 340 may be closed. Then, the laser controller 301 may return to the operation shown in FIG. 3.

4.1.4.5 Excitation Intensity Control Routine

Examples of the excitation intensity control routine in Step S112 of FIG. 3 will now be discussed.

4.1.4.5.1 First Example

A first example of the excitation intensity control routine will be discussed below with reference to FIG. 8 and continued reference to FIG. 2. The laser controller 301 may first increment a value n of a counter (not shown) by one (Step S151). The counter (not shown) may be an integer counter, and the initial value thereof may be set to zero. Then, the laser controller 301 may calculate a cumulative total value Tsum of the transmittance Tr (Step S152).

Then, the laser controller 301 may determine whether or not the value n of the counter has reached a preset base number J (Step S153). When the value n has not reached the base number J (Step S153; NO), the laser controller 301 may return to the operation shown in FIG. 3. On the other hand, when the value n has reached the base number J (Step S153;

YES), the laser controller 301 may calculate an average value Tave of the transmittance Tr by dividing the cumulative total value Tsum by the value n (Step S154).

Then, the laser controller 301 may determine whether or not the calculated average value Tave is smaller than the lower limit value Tmin of the permissible range RT loaded in Step S126 of FIG. 4 (Step S155). When the average value Tave is smaller than the lower limit value Tmin (Step S155; YES), the laser controller 301 may adjust the duty cycle D of the excitation power W to be supplied to at least one of the amplifiers $320_1$ through $320_n$ from the corresponding one or more of the RF power sources $321_1$ through $321_n$ so that the excitation intensity in the amplification unit 320 is raised (Step S156). An adjusting amount ΔD may be determined in advance through experiments or the like. Thereafter, the laser controller 301 may return to the operation shown in FIG. 3.

On the other hand, when the average value Tave is at or above the lower limit value Tmin (Step S155; NO), the laser controller 301 may then determine whether or not the average value Tave is greater than the upper limit value Tmax (Step S157). When the average value Tave is greater than the upper limit value Tmax (Step S157; YES), the laser controller 301 may adjust the duty cycle D of the excitation power W to be supplied to at least one of the amplifiers $320_1$ through $320_n$ from the corresponding one or more of the RF power sources $321_1$ through $321_n$ so that the excitation intensity in the amplification unit 320 is lowered (Step S158). The adjusting amount ΔD may be determined in advance through experiments or the like. Thereafter, the laser controller 301 may return to the operation shown in FIG. 3.

When the average value Tave is at or below the upper limit value Tmax (Step S157; NO), the laser controller 301 may retain the duty cycle D of the excitation power W (Step S159). Thereafter, the laser controller 301 may return to the operation shown in FIG. 3.

The above operation is suitable for the mid-to-long-term pulse energy control. In the mid-to-long-term pulse energy control, an average value of a larger number of sample values may be used, compared to the pulse-to-pulse energy control (short-term pulse energy control). In the first example, in place of the transmittance Tr, the control voltage value V to be applied to the optical shutter 340 for obtaining the corresponding transmittance Tr may be used.

4.1.4.5.2 Second Example

A second example of the excitation intensity control routine will be discussed next with reference to FIG. 9 and continued reference to FIG. 2. The laser controller 301 may first increment a value n of a counter (not shown) by one (Step S151). The counter may be an integer counter and the initial value thereof may be set to zero. Then, the laser controller 301 may calculate a cumulative total value ΔPsum of the difference ΔP between the detected energy value P and the energy instruction value Pt (e.g., ΔP=Pt−P) (Step S152a).

Then, the laser controller 301 may determine whether or not the value n of the counter has reached a preset base number J (Step S153). When the value n has not reached the base number J (Step S153; NO), the laser controller 301 may return to the operation shown in FIG. 3. On the other hand, when the value n has reached the base number J (Step S153; YES), the laser controller 301 may calculate an average value ΔPave of the difference ΔP by dividing the cumulative total value ΔPsum by the value n (e.g., ΔPsum/n) (Step S154a).

Then, the laser controller 301 may determine whether or not the calculated average value ΔPave is greater than the upper limit value ΔPmax of the permissible range RAP loaded in Step S126 of FIG. 4 (Step S155a). When the average value ΔPave is greater than the upper limit value ΔPmax (Step. S155a; YES), the laser controller 301 may adjust the duty cycle D of the excitation power W to be supplied to at least one of the amplifiers $320_1$ through $320_n$ from the corresponding one or more of the RF power sources $321_1$ through $321_n$ so that the excitation intensity in the amplification unit 320 is raised (Step S156). The adjusting amount ΔD may be determined in advance through experiments or the like. Thereafter, the laser controller 301 may return to the operation shown in FIG. 3.

On the other hand, when the average value ΔPave is at or below the upper limit value ΔPmax (Step S155a; NO), the laser controller 301 may then determine whether or not the average value ΔPave is smaller than the lower limit value ΔPmin (Step S157a). When the average value ΔPave is smaller than the lower limit value ΔPmin (Step S157a; YES), the laser controller 301 may adjust the duty cycle D of the excitation power W to be supplied to at least one of the amplifiers $320_1$ through $320_n$ from the corresponding one or more of the corresponding RF power sources $321_1$ through $321_n$ so that the excitation intensity in the amplification unit 320 is lowered (Step S158). The adjusting amount ΔD may be determined in advance through experiments or the like. Thereafter, the laser controller 301 may return to the operation shown in FIG. 3.

When the average value ΔPave is at or above the lower limit value ΔPmin (Step S157a; NO), the laser controller 301 may retain the duty cycle D of the excitation power W (Step S159). Thereafter, the laser controller 301 may return to the operation shown in FIG. 3.

In this way, the excitation intensity of the amplification unit 320 may be controlled based on the average value ΔPave of the difference ΔP between the detected energy value P and the energy instruction value Pt.

4.1.4.5.3 Third Example

A third example of the excitation intensity control routine will be discussed next with reference to FIG. 10 and continued reference to FIG. 2. The laser controller 301 may first increment a value n of a counter (not shown) by one (Step S151). The counter may be an integer counter, and the initial value thereof may be set to zero. Then, the laser controller 301 may calculate a cumulative total value Vsum of the control voltage value V (Step S152b).

Subsequently, the laser controller 301 may determine whether or not the value n of the counter has reached a preset base number J (Step S153). When the value n has not reached the base number J (Step S153; NO), the laser controller 301 may return to the operation shown in FIG. 3. On the other hand, when the value n has reached the base number J (Step S153; YES), the laser controller 301 may calculate an average value Vave of the control voltage value V by dividing the cumulative total value Vsum by the value n (Step. S154b).

Then, the laser controller 301 may determine whether or not the calculated average value Vave is smaller than the lower limit value Vmin of the permissible range RV loaded in Step S126 of FIG. 4 (Step S155b). When the average value Vave is smaller than the lower limit value Vmin (Step S155b; YES), the laser controller 301 may adjust the duty cycle D of the excitation power W to be supplied to at least one of the amplifiers $320_1$ through $320_n$ from the corresponding one or more of the RF power sources $321_1$ through $321_n$ so that the excitation intensity in the amplification unit 320 is raised (Step S156). The adjusting amount ΔD may be determined in advance through experiments or the like. Thereafter, the laser controller 301 may return to the operation shown in FIG. 3.

On the other hand, when the average value Vave is at or above the lower limit value Vmin (Step S155b; NO), the laser controller 301 may then determine whether or not the average value Vave is greater than the upper limit value Vmax (Step S157b). When the average value Vave is greater than the upper limit value Vmax (Step S157b; YES), the laser controller 301 may adjust the duty cycle D of the excitation power W to be supplied to at least one of the amplifiers $320_1$ through $320_n$ from the corresponding one or more of the RF power sources $321_1$ through $321_n$ so that the excitation intensity in the amplification unit 320 is lowered (Step S158). The adjusting amount ΔD may be determined in advance through experiments or the like. Thereafter, the laser controller 301 may return to the operation shown in FIG. 3.

When the average value Vave is at or below the upper limit value Vmax (Step S157b; NO), the laser controller 301 may retain the duty cycle D of the excitation power W (Step S159). Thereafter, the laser controller 301 may return to the operation shown in FIG. 3.

In this way, the excitation intensity of the amplification unit 320 may be controlled based on the average value Vave of the control voltage value V to be applied to the optical shutter 340.

4.1.4.6 Gain Calculation Routine

An example of the gain calculation routine in Step S113 of FIG. 3 will now be discussed. With reference to FIG. 11 and continued reference to FIG. 2, the laser controller 301 may load the excitation intensity (duty cycle D) currently set for the amplification unit 320 (or each of the amplifiers $320_1$ through $320_n$) (Step S161). Then, the laser controller 301 may calculate a gain G of the amplification unit 320 (or each of the amplifiers $320_1$ through $320_n$) based on the loaded excitation intensity (duty cycle D) (Step S162). Thereafter, the laser controller 301 may return to the operation shown in FIG. 3.

Figure 12:
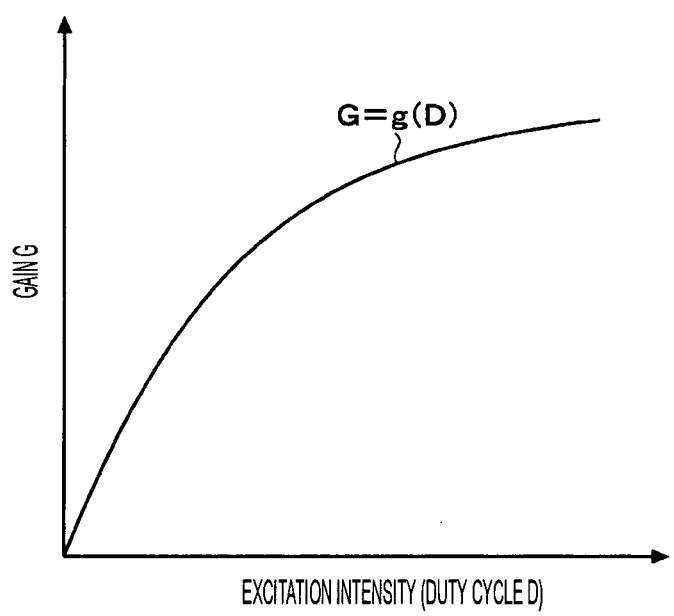
FIG. 12 shows an example of the relationship between the excitation intensities and corresponding gains according to the first embodiment.

Here, the excitation intensity (duty cycle D) and the gain G may, for example, have the relationship shown in FIG. 12. The gain G with respect to the excitation intensity (duty cycle D) may be calculated using an approximation function $G=g(D)$ prepared in advance for calculation, or may be obtained from a data table or the like for managing the corresponding relationship between the excitation intensity (duty cycle D) and the gain G. In this operation, the approximation function $G=g(D)$ and/or the data table may be stored in a memory (not shown) or the like, and the laser controller 301 may refer thereto as appropriate.

4.2 Embodiment Including Control of Output Energy of Master Oscillator (Second Embodiment)

Figure 13:
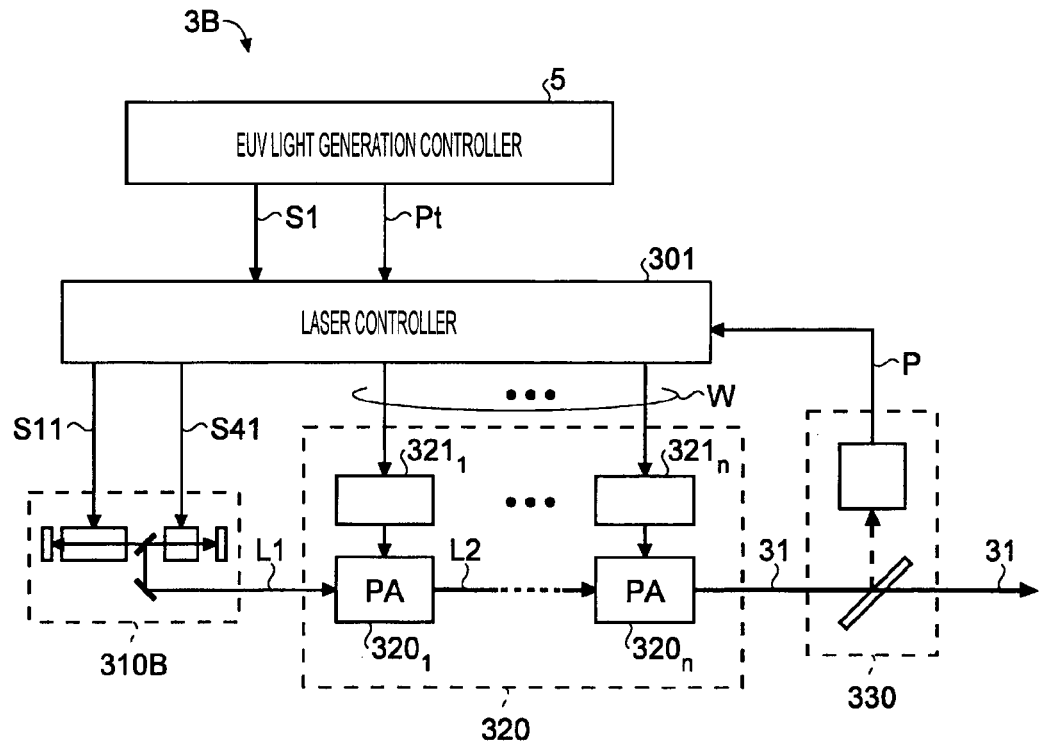
FIG. 13 schematically illustrates the configuration of a laser apparatus according to a second embodiment of this disclosure.

The operation of a laser apparatus 3B according to a second embodiment will be described in detail with reference to the drawings. FIG. 13 schematically illustrates the configuration of the laser apparatus 3B. As illustrated in FIG. 13, the laser apparatus 3B may be similar in configuration to the laser apparatus 3A shown in FIG. 2 except in that the seed laser device 310 of the laser apparatus 3A is replaced by a seed laser device 310B.

Figure 14:
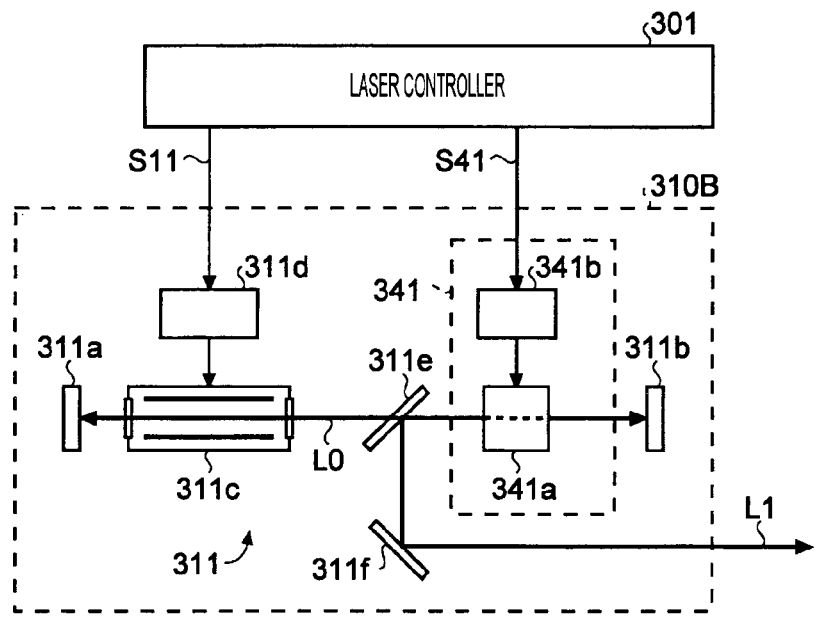
FIG. 14 schematically illustrates the configuration of a seed laser device according to the second embodiment.

FIG. 14 schematically illustrates the configuration of the seed laser device 310B. As illustrated in FIG. 14, the seed laser device 310B may include the master oscillator 311 and an optical shutter 341. The master oscillator 311 may include resonator mirrors 311a and 311b, a chamber 311c, an RF power source 311d, a polarization beam splitter 311e, and a high-reflection mirror 311f.

The chamber 311c may be arranged between the resonator mirrors 311a and 311b. The chamber 311c may have input and output windows through which the seed pulse laser beam L0 travels. The chamber 311c may be filled with a gain medium containing $CO_2$ gas. A pair of discharge electrodes may be provided inside the chamber 311c so as to face each other along a direction parallel to an optical path defined by the resonator mirrors 311a and 311b.

The RF power source 311d may be configured to supply the excitation power to the discharge electrodes in accordance with the oscillation signal S11 from the laser controller 301. The excitation power supplied to the discharge electrodes from the RF power source 311d may be constant.

The optical shutter 341 may include a Pockels cell 341a and a power source 341b. The Pockels cell 341a may be provided inside the master oscillator 311 in the optical path between the resonator mirrors 311a and 311b. The power source 341b may apply the control voltage to the Pockels cell 341a at the control voltage value V in accordance with the optical shutter switching signal S41 from the laser controller 301. With this, the phase of the seed pulse laser beam L0 passing through the Pockels cell 341a may be modulated in accordance with the control voltage value V.

The polarization beam splitter 311e may be arranged in the beam path defined by the resonator mirrors 311a and 311b. The polarization beam splitter 311e may transmit one polarization component and reflect the other polarization component of the seed pulse laser beam L0 incident thereon. The component of the seed pulse laser beam L0 reflected by the polarization beam splitter 311e may then be incident on and be reflected by the high-reflection mirror 311f and outputted from the seed laser device 310B as the seed pulse laser beam L1.

With this configuration, the phase of the seed pulse laser beam L0 may be modulated using the optical shutter 341 and a component of the seed pulse laser beam L0 may be outputted from the seed laser device 310B. Accordingly, the pulse energy of the seed pulse laser beam L1 outputted from the seed laser device 310B may be controlled on a pulse-to-pulse basis.

4.3 Embodiment Including Multiple Master Oscillators (Third Embodiment)

A laser apparatus 3C according to a third embodiment will now be described in detail with reference to the drawings.

4.3.1 Configuration

Figure 15:
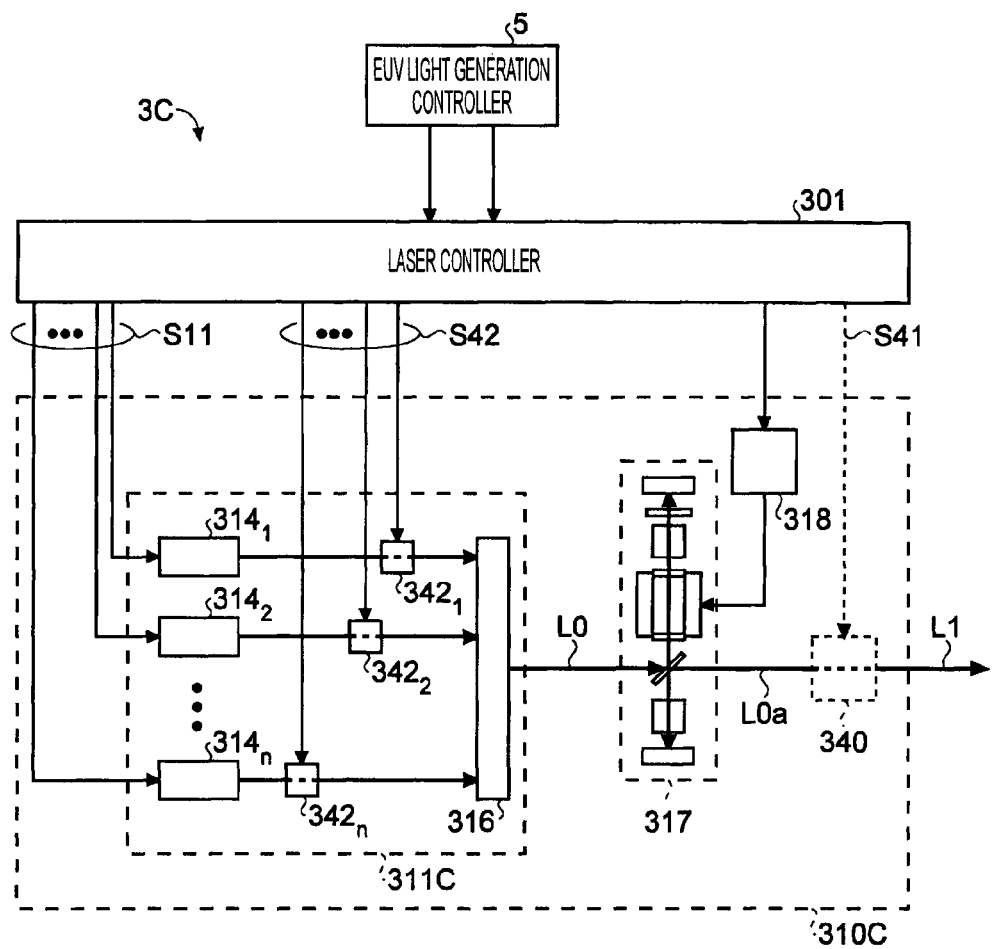
FIG. 15 schematically illustrates the configuration of a laser apparatus according to a third embodiment of this disclosure.

FIG. 15 schematically illustrates the configuration of the laser apparatus 3C. The amplification unit 320 and the energy monitor 330 of the laser apparatus 3C may be similar to the amplification unit 320 and the energy monitor 330 of the laser device 3A of the above-described embodiments, and they are not depicted in FIG. 15.

As illustrated in FIG. 15, the laser apparatus 3C may be similar in configuration to the laser apparatus 3A shown in FIG. 2 except in that the seed laser device 310 of the laser apparatus 3A is replaced by a seed laser device 310C. The seed laser device 310C may include a seed laser unit 311C, a regenerative amplifier 317, an RF power source 318, and the optical shutter 340. Here, the optical shutter 340 and a signal line for transmitting the optical shutter switching signal S41 can be omitted. Accordingly, these are illustrated in broken lines in FIG. 15.

The seed laser unit 311C may include master oscillators $314_1$ through $314_n$, corresponding optical shutters $342_1$ through $342_n$, and a beam path adjusting unit 316. Each of the master oscillators $314_1$ through $314_n$ may, for example, include a quantum cascade laser.

The optical shutters $342_1$ through $342_n$ may be provided downstream from the respective master oscillators $314_1$ through $314_n$. The transmittance of each of the optical shutters $342_1$ through $342_n$ may be controlled in accordance with the control voltage value V indicated by the optical shutter switching signals S42 from the laser controller 301. Here, the control voltage value V indicated by each of the optical shutter switching signals S42 may be the same or may differ from one another.

The beam path adjusting unit 316 may be configured to and positioned so as to make the beam paths of the pulse laser beams outputted from the optical shutters $342_1$ through $342_n$ substantially coincide with one another and may output as the seed pulse laser beam L0.

The seed pulse laser beam L0 outputted from the seed laser unit 311C may then be amplified in the regenerative amplifier 317. The optical shutter 340 may be arranged downstream from the regenerative amplifier 317.

4.3.2 Operation

As shown in FIG. 15, each of the master oscillators $314_1$ through $314_n$ may be configured to output a pulse laser beam at a wavelength contained in the gain bandwidth of the regenerative amplifier 317 and the amplification unit 320. The master oscillators $314_1$ through $314_n$ may oscillate at substantially the same wavelength or at respectively different wavelengths. Further, the master oscillators $314_1$ through $314_n$ may respectively oscillate in a single-longitudinal mode or in a multi-longitudinal mode. In the description to follow, the master oscillators $314_1$ through $314_n$ may each oscillate in a single-longitudinal mode and at respectively different wavelengths.

The laser controller 301 may control the master oscillators $314_1$ through $314_n$ to oscillate at a predetermined repetition rate. Further, the laser controller 301 may control the transmittance Trk (here, k being a number from 1 through n) of the respective optical shutters $342_1$ through $342_n$ based on an instruction value from the EUV light generation controller 5.

The pulse laser beams outputted from the master oscillators $314_1$ through $314_n$ may respectively enter the optical shutters $342_1$ through $342_n$, whereby the pulse energy of the pulse laser beams may be adjusted in accordance with the transmittance Trk set to the respective optical shutters $342_1$ through $342_n$.

The beam paths of the pulse laser beams outputted from the respective optical shutters $342_1$ through $342_n$ may be made to substantially coincide with one another by the beam path adjusting unit 316 and outputted from the beam path adjusting unit 316 as the seed pulse laser beam L0. The seed pulse laser beam L0a may then be amplified in the regenerative amplifier 317.

The laser controller 301 may be configured to control the transmittance Trk of at least one of the optical shutters $342_1$ through $342_n$ on a pulse-to-pulse basis based on the energy instruction value Pt from the EUV light generation controller 5. Further, the laser controller 301 may be configured to send a control signal to at least one of the RF power sources $321_1$ through $321_n$ in order to control the excitation intensity in the corresponding one or more of the amplifiers $320_1$ through $320_n$ based on the energy instruction value Pt from the EUV light generation controller 5. As another control method, the laser controller 301 may be configured to control the transmittance Trk of at least one of the optical shutters $342_1$ through $342_n$ on a pulse-to-pulse basis based on the detected energy value P of the energy monitor 330 and the energy instruction value Pt from the EUV light generation controller 5.

Alternatively, the master oscillators $314_1$ through $314_n$ and the regenerative amplifier 317 may be operated under a constant condition (e.g., a constant repetition rate, constant excitation intensity). In this case, the transmittance Tr of the optical shutter 340 may be controlled on a pulse-to-pulse basis.

In place of the master oscillators $314_1$ through $314_n$, continuous wave (CW) $CO_2$ lasers configured to oscillate in a single-longitudinal mode may be used. Alternatively, the laser controller 301 may cause the master oscillators $314_1$ through $314_n$ to oscillate in the continuous wave with constant output. Further, the laser controller 301 may be configured to control the transmittance Trk and the open time of each of the optical shutters $342_1$ through $342_n$ based on an instruction value from the EUV light generation controller 5.

4.3.3 Effect

According to the third embodiment, the pulse energy of the pulse laser beams outputted from the respective master oscillators may be controlled on a pulse-to-pulse basis by the respective optical shutters, and the pulse energy of the seed pulse laser beam entering the amplification unit 320 may further be controlled on a pulse-to-pulse basis by the optical shutter 340. Accordingly, the pulse energy of the pulse laser beam 31 amplified in the amplification unit 320 may be controlled in an even wider dynamic range.

4.4 Amplification Unit (Fourth Embodiment)

An amplification unit including multiple amplifiers will now be described in detail, as a fourth embodiment, with reference to the drawings.

4.4.1 Configuration

Figure 16:
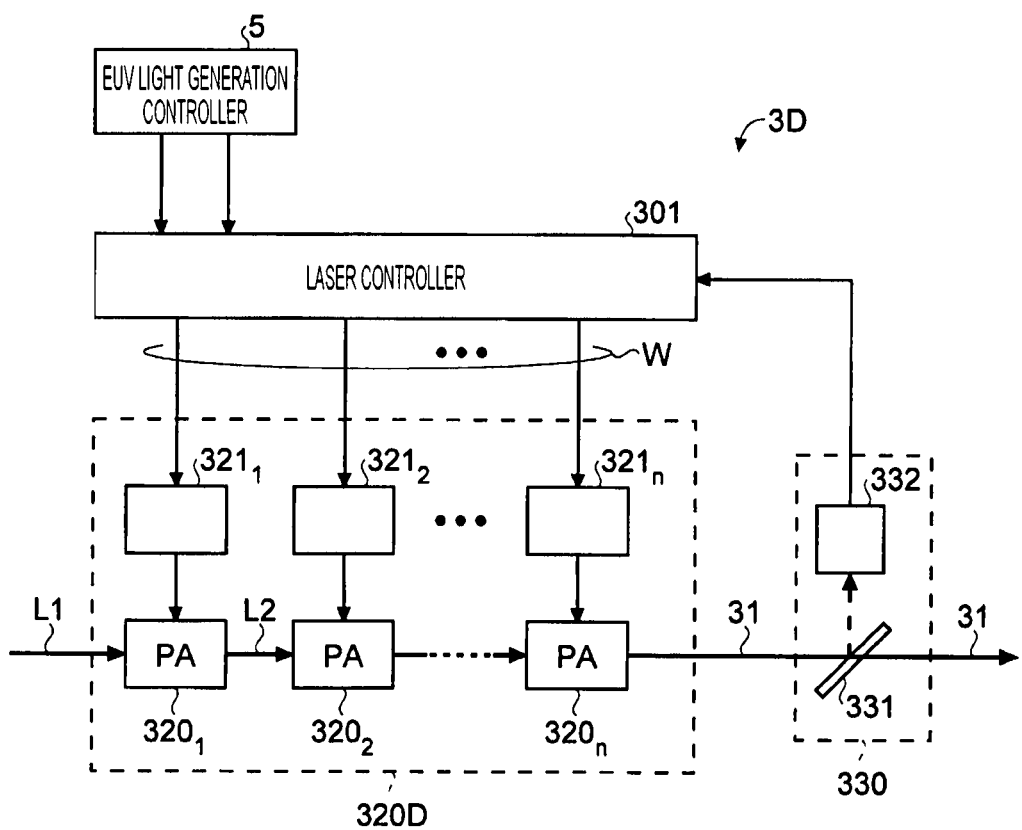
FIG. 16 schematically illustrates the configuration of a laser apparatus according to a fourth embodiment of this disclosure.

FIG. 16 schematically illustrates the configuration of a laser apparatus 3D according to the fourth embodiment. Here, the seed laser device in the laser apparatus 3D may be similar to the seed laser device 310C of the above-described third embodiment and therefore is not depicted in FIG. 16. As illustrated in FIG. 16, an amplification unit 320D may include the amplifiers $320_1$ through $320_n$ and the corresponding RF power sources $321_1$ through $321_n$.

4.4.2 Operation

The laser controller 301 may send a control signal to at least one of the RF power sources $321_1$ through $321_n$ through the amplification controller 304 (see FIG. 2) based on the energy instruction value Pt from the EUV light generation controller 5 so as to control the excitation intensity in the corresponding one or more of the amplifiers $320_1$ through $320_n$. Alternatively, the laser controller 301 may send a control signal to at least one of the RF power sources $321_1$ through $321_n$ through the amplification controller 304 (see FIG. 2) based on the detected energy value P of the energy monitor 330 and the energy instruction value Pt from the EUV light generation controller 5 so as to control the excitation intensity of the corresponding one or more of the amplifiers $320_1$ through $320_n$.

4.4.3 Effect

According to the fourth embodiment, the amplification unit 320D may include the multiple amplifiers $320_1$ through $320_n$, and controlling the excitation intensity of each of the amplifiers $320_1$ through $320_n$ may allow the pulse energy of the pulse laser beam 31 to be controlled in a wider dynamic range, compared to the case of controlling the pulse energy by controlling a single amplifier.

4.4.4 Control Flow

The operation of the laser apparatus 3D may be similar to the operation described in relation to the first embodiment. Thus, the operation of the laser apparatus 3D may basically be discussed with reference to the flow charts shown in FIGS. 3 through 10. However, in the fourth embodiment, the gain calculation routine as shown in FIG. 11 may be replaced by the gain calculation routine as shown in FIG. 17.

Figure 17:
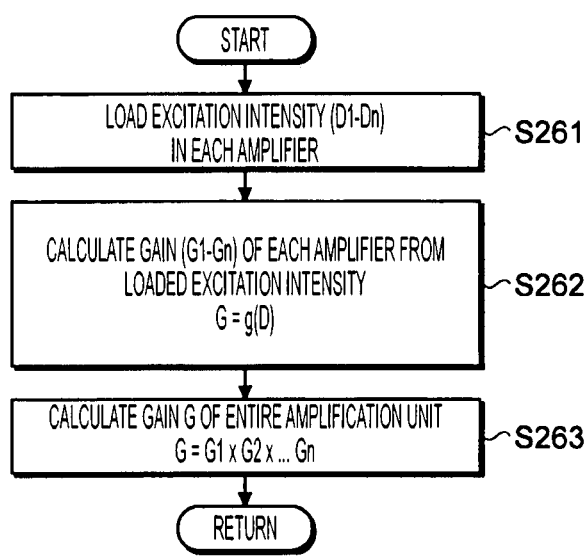
FIG. 17 shows another example of the gain calculation routine in Step S113 of FIG. 3 according to the fourth embodiment.

With reference to FIG. 17 and continued reference to FIG. 16, the laser controller 301 may load the excitation intensity currently set for the amplifiers $320_1$ through $320_n$ from a memory (not shown) (Step S261). The excitation intensity may, for example, be duty cycles D1 through Dn. Then, the laser controller 301 may calculate gains G1 through Gn of the amplifiers $320_1$ through $320_n$ based on the loaded excitation intensity (duty cycles D1 through Dn) (Step S262). When calculating the gains G1 through Gn, a function obtained using an approximation or the like from the relationship between the excitation intensity and the gain may be used. The relationship here may be obtained in advance through experiments or the like. When the relationship between the excitation intensity and the gain is calculated using a function G=g(D), the function G=g(D) may differ for each amplifier. That is, a function G1=g1(D1) through a function Gn=gn(Dn) may exist. Subsequently, the laser controller 301 may calculate the gain G of the entire amplification unit 320 from the calculated gains G1 through Gn of the amplifiers $320_1$ through $320_n$ (Step S263). Thereafter, the laser controller 301 may return to the operation shown in FIG. 3. Here, the gain G of the entire amplification unit 320 may be obtained from Expression (5) below, where G1, G2, . . . , Gn express the gains of the respective amplifiers $320_1$ through $320_n$.

$$G=G1 \cdot G2 \cdot \ldots \cdot Gn \quad (5)$$

5. Controlling Optical Shutter

An example of the optical shutter in one or more of the above embodiments will now be described with reference to the drawings. Here, the optical shutter 340 will be discussed as the example; however, the following discussion may be applicable to the other optical shutters.

5.1 Optical Shutter 5.1.1 Combination of Pockels Cell and Polarizers

Figure 18:
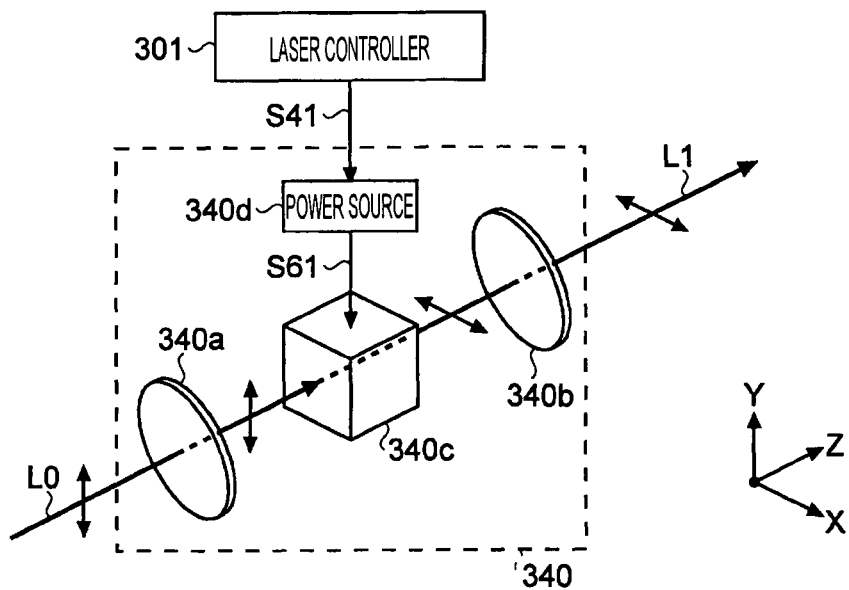
FIG. 18 schematically illustrates an example of an optical shutter which includes two polarizers and a Pockels cell.

FIG. 18 illustrates an example of the optical shutter 340 including two polarizers 340a and 340b and a Pockels cell 340c. As illustrated in FIG. 18, the optical shutter 340 may, for example, include two polarizers 340a and 340b, the Pockels cell 340c, and a power source 340d. The polarizer 340a may be arranged, for example, to transmit a Y-polarization component of a pulse laser beam incident thereon and block an X-polarization component thereof. Meanwhile, the polarizer 340b may be arranged, for example, to transmit the X-polarization component of a pulse laser beam incident thereon and block the Y-polarization component thereof. In this way, the polarizers 340a and 340b may be arranged to transmit different polarization components. As in this example, the polarizers 340a and 340b may be arranged so that the polarization directions of the pulse laser beam transmitted through the respective polarizers 340a and 340b may differ by 90 degrees.

The optical shutter switching signal S41 may be inputted to the power source 340d from the laser controller 301. Upon receiving the optical shutter switching signal S41, the power source 340d may apply a voltage S61 to the Pockels cell 340c. The voltage S61 may have a pulse width (temporal duration) substantially equal to pulse width of the optical shutter switching signal S41. The Pockels cell 340c may modulate the phase of the pulse laser beam passing therethrough while the voltage S61 is being applied thereto.

The seed pulse laser beam L0 entering the optical shutter 340 may first be incident on the polarizer 340a, and the Y-polarization component of the seed pulse laser beam L0 may be transmitted through the polarizer 340a. The Y-polarization component of the seed pulse laser beam L0 may then enter the Pockels cell 340c.

When the voltage S61 is not being applied to the Pockels cell 340c, the Y-polarization component having entered the Pockels cell 340c may be outputted therefrom while being retained as a linearly-polarized (in Y-direction) seed pulse laser beam. This linearly-polarized seed pulse laser beam may then be incident on the polarizer 340b and may be blocked by the polarizer 340b. In this way, the seed pulse laser beam L0 may be blocked by the optical shutter 340 while the voltage S61 is not applied to the Pockels cell 340c.

On the other hand, when the voltage S61 is being applied to the Pockels cell 340c, the phase of the Y-polarization component of the seed pulse laser beam L0 passing through the Pockels cell 340c may be modulated in accordance with the voltage S61. This phase modulated component of the seed pulse laser beam L0 may then be incident on the polarizer 340b, and the X-polarization component thereof may be transmitted through the polarizer 340b. With this, the X-polarization component may be outputted from the optical shutter 340 as the seed pulse laser beam L1.

Figure 19:
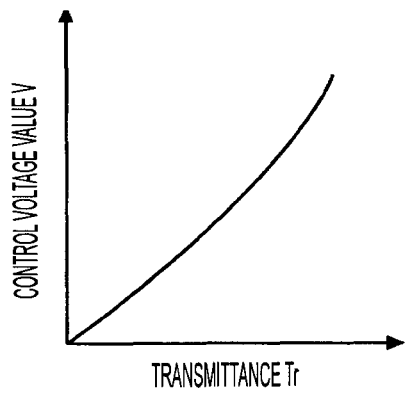
FIG. 19 shows an example of the relationship between the control voltage values of a high-voltage pulse to be applied to the Pockels cell and the corresponding transmittance of the optical shutter.

FIG. 19 shows an example of the relationship between the control voltage value V of the voltage to be applied to the Pockels cell 340c and the transmittance Tr of the optical shutter 340. As shown in FIG. 19, the control voltage value V and the transmittance Tr may exhibit a one-to-one correspondence. Accordingly, the control voltage value V may be calculated from the transmittance Tr required for the optical shutter 340, and a voltage of this control voltage value v may be applied to the Pockels cell 340c to achieve the required transmittance Tr. Controlling the transmittance Tr of the optical shutter 340 in this way may allow the pulse energy of the seed pulse laser beam L1 to be controlled.

With the above configuration, the seed pulse laser beam L1 with the pulse energy corresponding to the transmittance Tr (in turn corresponding to the control voltage value V) may be outputted from the optical shutter 340. In this way, the pulse energy of the seed pulse laser beam L1 may be adjusted.

In addition, the optical shutter 340 may be used to suppress a self-oscillation beam and/or a returning beam from an amplifier or the like provided down stream from the optical shutter 340 in a case where the voltage is applied to the Pockels cell 340c in synchronization with the seed pulse laser beam L0. Further, switching the optical shutter 340 on and off while allowing the master oscillator 311 to oscillate continually at a predetermined repetition rate may allow the seed pulse laser beam L1 to be outputted in bursts.

Figure 20:
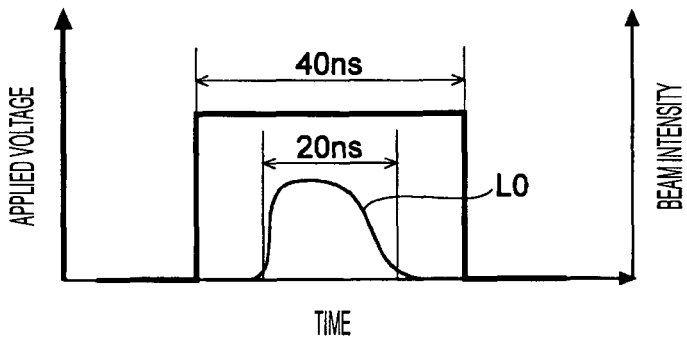
FIG. 20 shows the relationship between a single pulse included in a pulse laser beam and the operation of an optical shutter according to one or more of the embodiments in this disclosure.

FIG. 20 shows an example of the relationship between a single pulse in the seed pulse laser beam L0 and switching of the optical shutter 340. As shown in FIG. 20, when the pulse width of the seed pulse laser beam L0 is, for example, 20 ns, a voltage with such a pulse width that can absorb some timing jitter of the seed pulse laser beam L0 (for example, 40 ns) may preferably be applied to the Pockels cell 340c of the optical shutter 340. Here, when the pulse width of the voltage is too large, a returning beam may not be blocked by the optical shutter 340 in some cases. Accordingly, the pulse width of the voltage may preferably be set appropriately. It should be noted that a Pockels cell typically has a few-nanosecond-responsiveness; thus, it may be suitably used in an optical shutter for a laser apparatus where high-speed switching is often required.

6. Controlling Excitation Intensity in Amplifier

The control of the excitation intensity in the amplifiers $320_1$ through $320_n$ in one or more of the above embodiments will now be described in more detail with reference to the drawings. Here, a pulse width modulation (PWM) method, and a potential control method will be discussed as examples.

6.1 PWM Method

In the PWM method, a duty cycle of voltage pulses may be modulated. In one or more of the embodiments, the duty cycle D of the voltage pulses (excitation power W) supplied to the amplifiers $320_1$ through $320_n$ from the corresponding RF power sources $321_1$ through $321_n$ may be varied. Here, the duty cycle means a ratio of a pulse width to a single cycle of a periodic pulse wave, and may be represented by Expression (6) below.

$$D = \tau/Ts \quad (6)$$

Here, D is a duty cycle, t is a pulse width, and Ts is the duration of a single cycle. For example, when the cycle Ts is 10 μs and the pulse width τ is 1 μs, the duty cycle D turns out to be 0.1 (10%) based on Expression (6) above.

Figure 21:
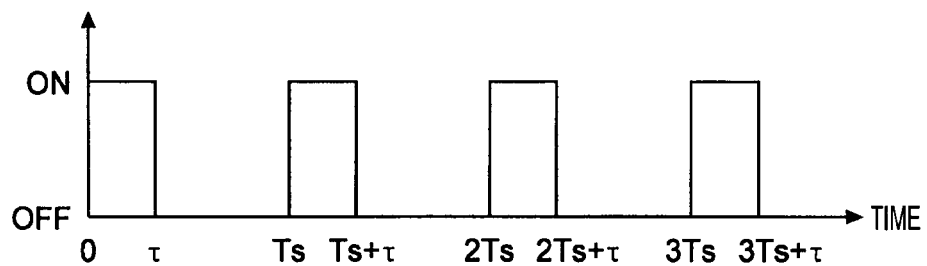
FIG. 21 shows an example of signals inputted from a laser controller to an RF power source indicating excitation power to be supplied from the RF power source to an amplifier when a duty cycle is set to τ/T.
Figure 22:
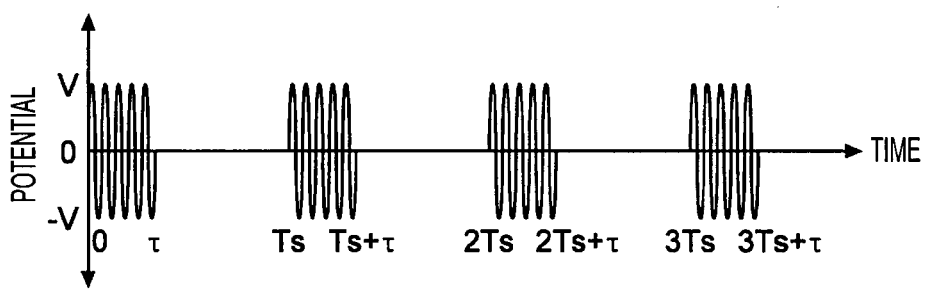
FIG. 22 shows the excitation power supplied to the amplifier from the RF power source in the case shown in FIG. 21.

FIG. 21 shows signals specifying the excitation power W inputted to the RF power sources $321_1$ through $321_n$ from the laser controller 301 when the duty cycle D is τ/Ts. FIG. 22 shows the excitation power W supplied to the amplifiers $320_1$ through $320_n$ from the respective RF power sources $321_1$ through $321_n$ in the case shown in FIG. 21. As shown in FIG. 21, in the PWM method, rectangular-wave signals, for example, may be inputted to the RF power sources $321_1$ through $321_n$ from the laser controller 301. With this, the intermittent RF voltages as shown in FIG. 22 may be applied to the amplifiers $320_1$ through $320_n$ from the respective RF power sources $321_1$ through $321_n$.

In the PWM method, the control of the excitation intensity may be achieved, for example, by varying the duty cycle D of the rectangular-wave signals. Controlling the duty cycle D of the RF voltage to be applied between a pair of electrodes in each of the amplifiers $320_1$ through $320_n$ may in turn allow the excitation intensity of the gain medium included in the amplifiers $320_1$ through $320_n$ to be controlled.

Here, when the cycle Ts is 10 μs, the PWM frequency is 100 kHz (=1/Ts). When, for example, the repetition rate of the pulse laser beam outputted from the master oscillator 311 is 100 kHz, the repetition rate of pulse laser beam may preferably be synchronized with the PWM frequency.

6.2 Potential Control Method

Figure 23:
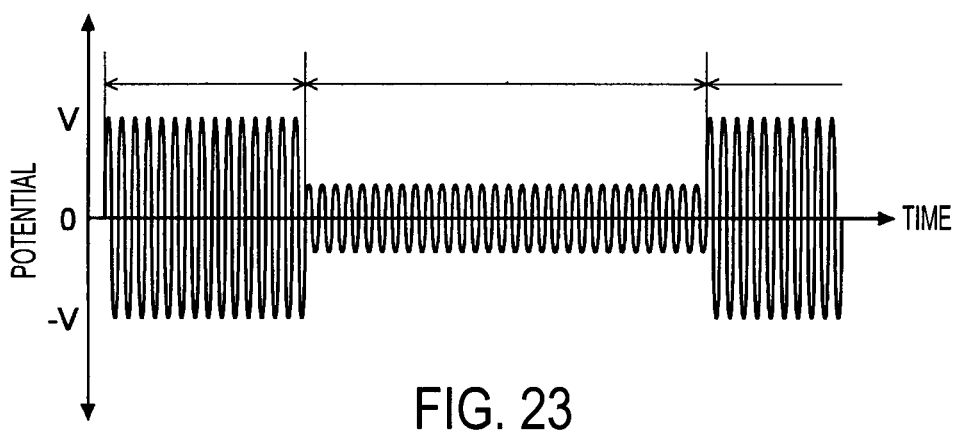
FIG. 23 shows an RF voltage supplied to the amplifier from the RF power source in a potential control method.

The potential control method will be discussed below with reference to the drawing. FIG. 23 shows the RF voltages applied to the amplifiers $320_1$ through $320_n$ from the respective RF power sources $321_1$ through $321_n$ in the potential control method. In the potential control method, the amplitude of the RF voltage may be varied in accordance with the required excitation intensity. As shown in FIG. 23, the amplitude of the RF voltage applied to the amplifiers $320_1$ through $320_n$ from the respective RF power sources $321_1$ through $321_n$ may be smaller during a given period than during a period outside thereof. With this, the excitation intensity during the given period may be lowered. In this way, controlling the amplitude of the RF voltage may allow the excitation energy supplied to the amplifiers $320_1$ through $320_n$ per unit time to be controlled.

7. Extreme Ultraviolet Light Generation System Including Laser Apparatus (Fifth Embodiment)

An example of an EUV light generation system including the above-described laser apparatus now will be described in detail with reference to the drawings. In the description to follow, the laser apparatus 3A of the first embodiment will be used as an example. However, this disclosure is not limited thereto, and any of the above-described laser apparatuses may be used instead.

7.1 Configuration

Figure 24:
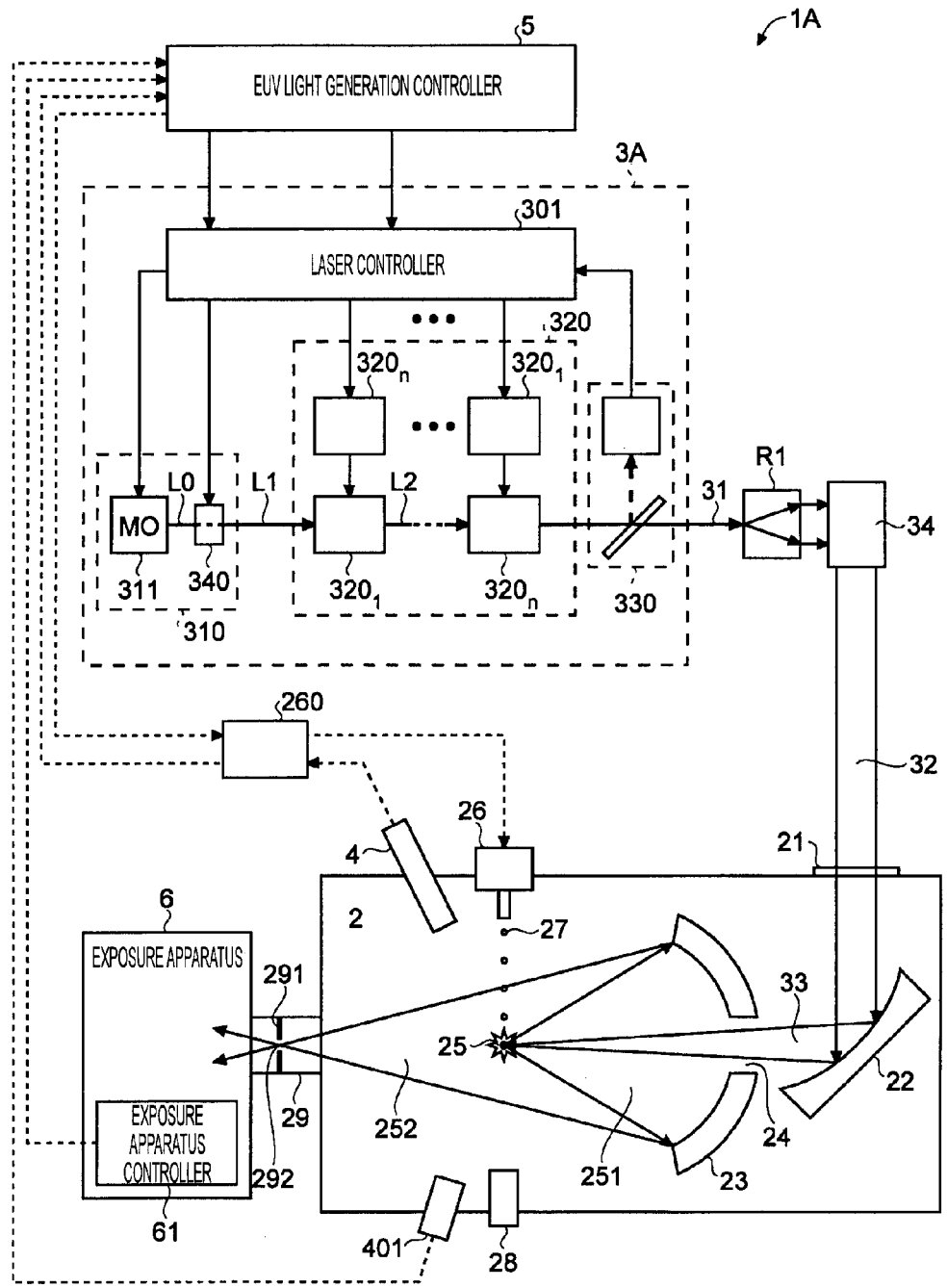
FIG. 24 schematically illustrates the configuration of an EUV light generation system according to a fifth embodiment of this disclosure.

FIG. 24 schematically illustrates the configuration of an EUV light generation system 1A according to a fifth embodiment. As illustrated in FIG. 24, the EUV light generation system 1A may include the laser apparatus 3A (see FIG. 2), the EUV light generation controller 5, a relay optical system R1, the laser beam direction control unit 34, and the chamber 2. The chamber 2 may include the target generator 26, a target controller 260, the target collector 28, the target sensor 4, and an EUV light energy sensor 401.

The laser controller 301 of the laser apparatus 3A may be connected to the EUV light generation controller 5. The EUV light generation controller 5 may in turn be connected to the target controller 260, the EUV light energy sensor 401, and the exposure apparatus controller 61.

7.2 Operation

With reference to FIG. 24, the EUV light generation controller 5 may receive an EUV light request signal requesting for the EUV light 252 and an EUV light energy instruction value Et specifying required energy of the EUV light 252 from the exposure apparatus controller 61. The EUV light generation controller 5 may be configured to send a target output signal to the target generator 26 through the target controller 260.

The target sensor 4 may be configured to detect a target 27 passing through a predetermined position. Upon detecting the target 27, the target sensor 4 may send a detection signal to the EUV light generation controller 5 through the target controller 260.

The EUV light generation controller 5 may be configured to send the energy instruction value Pt to the laser controller 301 based on the EUV light energy instruction value Et received from the exposure apparatus controller 61. Alternatively, the EUV light generation controller 5 may be configured to send the energy instruction value Pt to the laser controller 301 based on a detected EUV light energy value E of the EUV light 252 received from the EUV light energy sensor 401.

The EUV light generation controller 5 may be configured to send a pulse laser beam request signal to the laser controller 301 based on the EUV light request signal received from the exposure apparatus controller 61 and/or the detection signal of the target 27 received from the target controller 260. With this, the target 27 may be irradiated with the pulse laser beam 33 when the target 27 reaches the plasma generation region 25.

The laser controller 301 may be configured to send various signals, as described in the first embodiment, to the master oscillator 311 and the optical shutter 340. With this, the pulse laser beam 31 may be outputted from the laser apparatus 3A.

The pulse laser beam 31 may be expanded in diameter by the relay optical system R1 and outputted therefrom as the pulse laser beam 32. The pulse laser beam 32 may pass through the laser beam direction control unit 34, and enter the chamber 2 through the window 21. Thereafter, the pulse laser beam 32 may be reflected by the laser beam focusing mirror 22, and, as the pulse laser beam 33, strike the target 27 in the plasma generation region 25. With this, the target 27 formed by a target material (e.g., tin (Sn)) may be turned into plasma, and the light 251 including the EUV light 252 may be emitted from the plasma.

The pulse energy of the collected EUV light 252 may be detected by the EUV light energy sensor 401. The detected EUV light energy value E may be sent to the EUV light generation controller 5.

7.3 Control Flow

Figure 25:
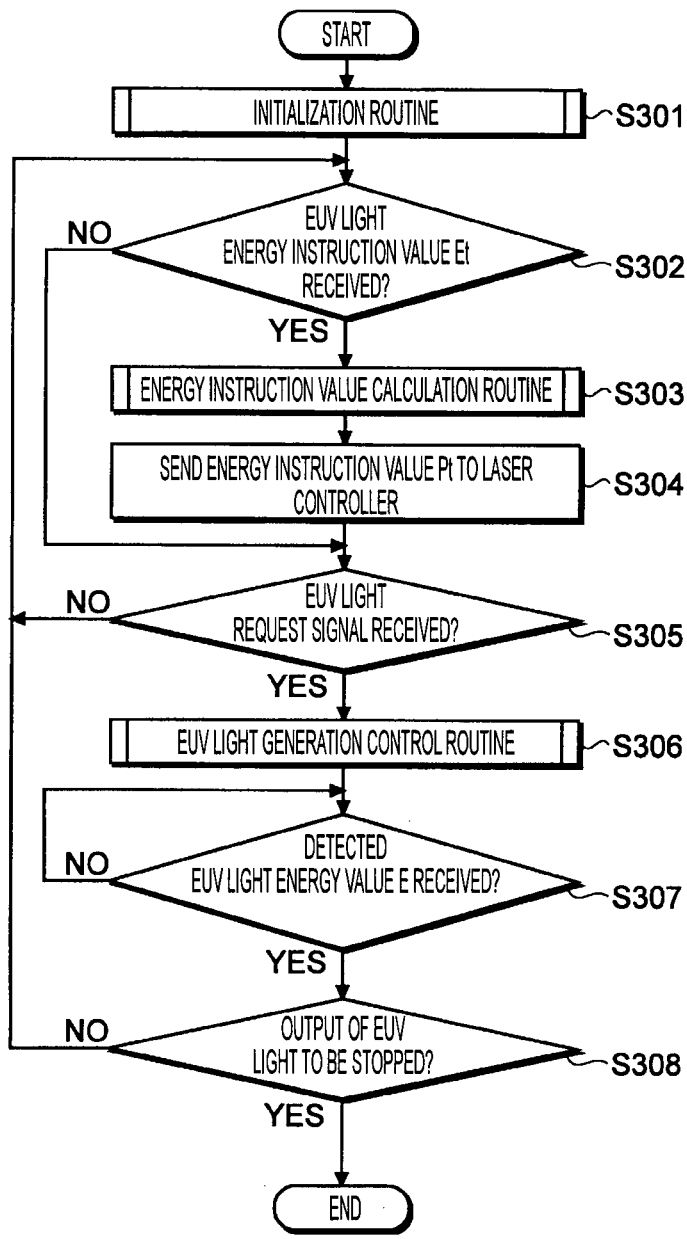
FIG. 25 shows the overall operation of the EUV light generation system shown in FIG. 24.
Figure 26:
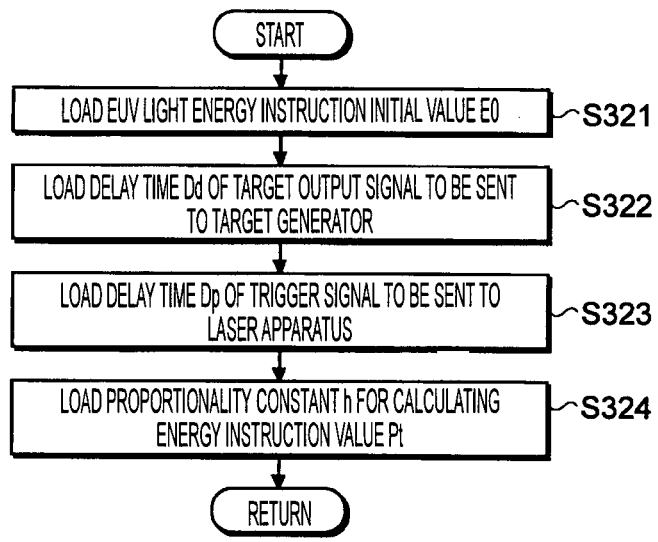
FIG. 26 shows an example of an initialization routine in Step S301 of FIG. 25.
Figure 27:
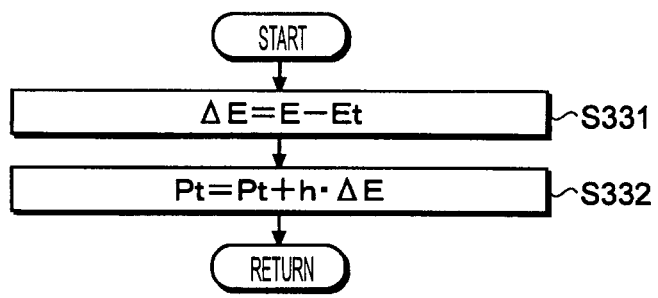
FIG. 27 shows an example of an energy instruction value calculation routine in Step S303 of FIG. 25.
Figure 28:
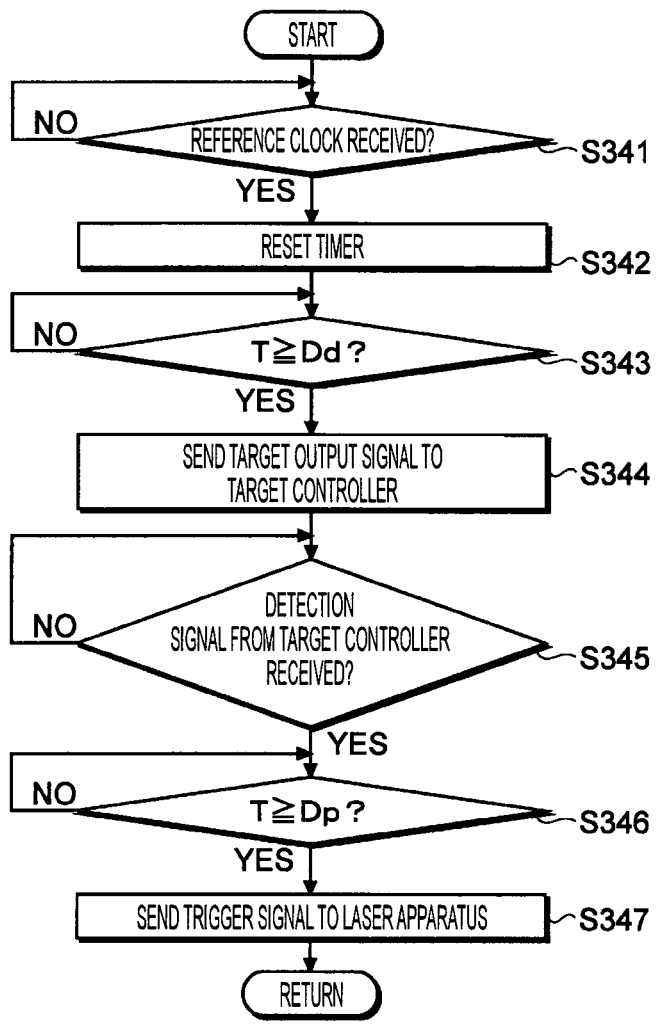
FIG. 28 shows an example of an EUV light generation control routine in Step S306 of FIG. 25.

The operation of the EUV light generation system 1A will now be described in detail with reference to the drawings. FIG. 25 shows the overall operation of the EUV light generation system 1A. FIG. 26 shows an example of an initialization routine in Step S301 of FIG. 25. FIG. 27 shows an example of an energy instruction value calculation routine in Step S303 of FIG. 25. FIG. 28 shows an example of an EUV light generation control routine in Step S306 of FIG. 25. The description to follow may focus on the operation of the EUV light generation controller 5.

7.3.1 Overall Flow

With reference to FIG. 25 and continued reference to FIG. 24, the EUV light generation controller 5 may first execute the initialization routine for setting initial values of the parameters used in this operation (Step S301). Then, the EUV light generation controller 5 may determine whether or not it has received the EUV light energy instruction value Et from the exposure apparatus controller 61 (Step S302). When the EUV light energy instruction value Et has been received (Step S302; YES), the EUV light generation controller 5 may execute the energy instruction value calculation routine for calculating the energy instruction value Pt required for the pulse laser beam 31 from the laser apparatus 3A (Step S303). The EUV light generation controller 5 may then send the calculated energy instruction value Pt to the laser controller 301 (Step S304). Thereafter, the EUV light generation controller 5 may proceed to Step S305. On the other hand, when the EUV light energy instruction value Et has not received (Step S302; NO), the EUV light generation controller 5 may move from Step S302 to Step S305.

In Step S305, the EUV light generation controller 5 may determine whether or not it has received the EUV light request signal from the exposure apparatus controller 61 (Step S305). When the EUV light request signal has not been received (Step S305; NO), the EUV light generation controller 5 may return to Step S302. On the other hand, when the EUV light request signal has been received (Step S305; YES), the EUV light generation controller may execute the EUV light generation control routine for controlling the generation of the EUV light 252 (Step S306).

Subsequently, the EUV light generation controller 5 may stand by until it receives the detected EUV light energy value E from the EUV light energy sensor 401 (Step S307; NO). Upon receiving the Detected EUV light energy value E (Step S307; YES), the EUV light generation controller 5 may determine whether or not the output of the EUV light 252 is to be stopped (Step S308). When the output of the EUV light 252 is to be stopped (Step S308; YES), the EUV light generation controller 5 may terminate this operation. On the other hand, when the output of the EUV light 252 is not to be stopped (Step S308; NO), the EUV light generation controller 5 may return to Step S302.

7.3.2 Initialization Routine

An example of the initialization routine in Step S301 of FIG. 25 will now be discussed. With reference to FIG. 26 and continued reference to FIG. 24, the EUV light generation controller 5 may load an EUV light energy instruction initial value E0, which is an initial value of the EUV light energy instruction value Et (Step S321). The EUV light generation controller 5 may then load a delay time Dd of the target output signal to be sent to the target generator 26 with respect to a predetermined time (Step S322). Here, the predetermined time may, for example, be based on a reference clock generated by a reference clock generator (not shown). The EUV light generation controller 5 may then load a delay time Dp of the trigger signal S1 to be sent to the laser controller 301 with respect to the predetermined time (Step S323). The EUV light generation controller 5 may then load a proportionality constant h used to calculate the energy instruction value Pt from the EUV light energy instruction value Et (Step S324). Thereafter, the EUV light generation controller 5 may return to the operation shown in FIG. 25. In the above operation, the various values may be loaded from a memory (not shown) or the like.

7.3.3 Energy Instruction Value Calculation Routine

An example of the energy instruction value calculation routine in Step S303 of FIG. 25 will now be discussed. With reference to FIG. 27 and continued reference to FIG. 24, the EUV light generation controller 5 may calculate a difference $\Delta E$ between the EUV light energy instruction value Et received from the exposure apparatus controller 61 and the detected EUV light energy value E detected by the EUV light energy sensor 401 (e.g., $\Delta E = E - Et$) (Step S331). When the energy instruction value calculation routine is executed for the first time in this operation, the EUV light energy instruction initial value E0 may be used in place of the detected EUV light energy value E. Then, the EUV light generation controller 5 may calculate an updated energy instruction value Pt by multiplying the calculated difference $\Delta E$ by the proportionality constant h and adding the product to the current energy instruction value Pt (e.g., Pt (updated)=Pt (current)+h·$\Delta E$) (Step S332). Here, when the energy instruction value calculation routine is executed for the first time in this operation, the energy instruction value Pt may be set to a predetermined initial value. Thereafter, the EUV light generation controller 5 may return to the operation shown in FIG. 25.

7.3.4 EUV Light Generation Control Routine

An example of the EUV light generation control routine in Step S306 of FIG. 25 will now be discussed. With reference to FIG. 28 and continued reference to FIG. 24, the EUV light generation controller 5 may stand by until it receives the reference clock (Step S341; NO). Upon receiving the reference clock (Step S341; YES), the EUV light generation controller 5 may reset a count value T of a timer (not shown) (Step S342). Then, the EUV light generation controller 5 may stand by until an elapsed time from the reference clock reaches the delay time Dd (Step S343; NO). When the elapsed time reaches the delay time Dd (Step S343; YES), the EUV light generation controller 5 may send the target output signal to the target controller 260 (Step S344). With this, the target controller 260 may control the target generator 26 to output the target 27.

Subsequently, the EUV light generation controller 5 may stand by until it receives a detection signal of the target 27 from the target controller 260 (Step S345; NO). Upon receiving the detection signal (Step S345; YES), the EUV light generation controller 5 may stand by until an elapsed time from the reference clock reaches the delay time Dp (Step S346; NO). When the elapsed time reaches the delay time Dp (Step S346; YES), the EUV light generation controller 5 may send the trigger signal S1 to the laser controller 301 (Step S347). With this, the laser controller 301 may control the laser apparatus 3A to output the pulse laser beam 31.

8. Supplementary Descriptions 8.1 Variation of Optical Shutter

Figure 29:
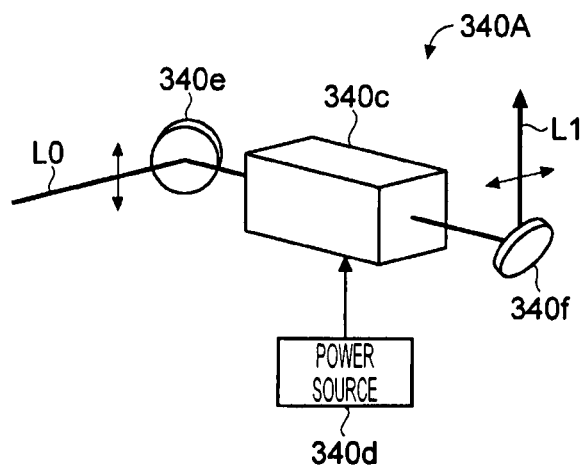
FIG. 29 schematically illustrates an example of the optical shutter.

FIG. 29 shows a variation of the above-described optical shutter 340. As illustrated in FIG. 29, an optical shutter 340A may include, for example, two reflective polarizers 340e and 340f, the Pockels cell 340c, and the power source 340d. Even with the reflective polarizers 340e and 340f, a similar function to that of the optical shutter 340 may be achieved by operating the optical shutter 340A similarly to the optical shutter 340. When reflective polarizers 340e and 340f are used, an optical shutter which is more resistive to heat load may be obtained, compared to the case where transmissive polarizers are used. Here, being resistive to heat load means that the optical shutter is less likely to be heated, or can be operated more stably against a rise in temperature thereof.

8.2 Regenerative Amplifier

Figure 30:
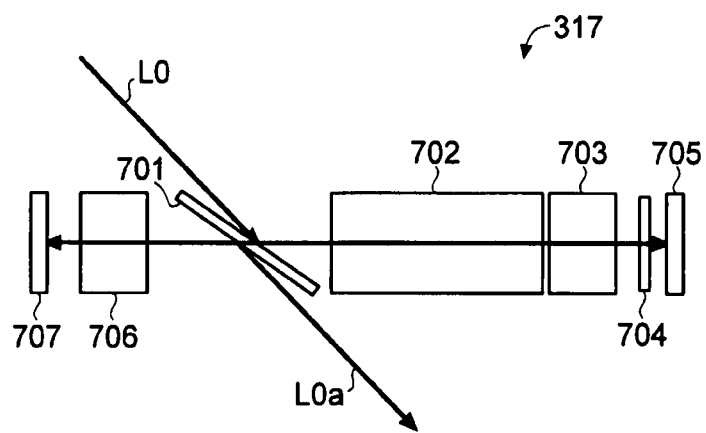
FIG. 30 schematically illustrates an example of a regenerative amplifier.

The aforementioned regenerative amplifier 317 will now be discussed in more detail. FIG. 30 illustrates an example of the regenerative amplifier 317. The regenerative amplifier 317 may include a polarization beam splitter 701, a $CO_2$ gas amplification part 702, Pockels cells 703 and 706, a quarter-wave plate 704, and resonator mirrors 705 and 707.

The polarization beam splitter 701 may be formed of a thin-film polarizer, for example. The polarization beam splitter 701 may be configured to reflect the S-polarization component of a pulse laser beam incident thereon and transmit the P-polarization component thereof. The seed pulse laser beam L0 having entered the regenerative amplifier 317 may first be incident on the polarization beam splitter 701 mostly as the S-polarization component and be reflected thereby. With this, the seed pulse laser beam L0 may be introduced into a resonator formed by the resonator minors 705 and 707. The seed pulse laser beam L0 introduced into the resonator may be amplified as it passes through the $CO_2$ gas amplification part 702. The seed pulse laser beam L0 may then pass through the Pockels cell 703, to which a voltage is not applied, be transmitted through the quarter-wave plate 704, be reflected by the resonator mirror 705, and again be transmitted through the quarter-wave plate 704.

The seed pulse laser beam L0 may then again pass through the Pockels cell 703, to which a voltage is not applied. At this point, a predetermined voltage may be applied to the Pockels cell 703 from a power source (not shown). With this, the Pockels cell 703 may give a quarter-wave phase shift to a pulse laser beam passing therethrough. In this way, while the predetermined voltage is applied to the Pockels cell 703, the polarization direction of the seed pulse laser beam L0 may be retained so as to be incident on the polarization beam splitter 701 mostly as the P-polarization component. Accordingly, the seed pulse laser beam L0 may be trapped in the resonator.

At the timing at which the seed pulse laser beam L0 is to be outputted, a predetermined voltage may be applied to the Pockels cell 706 from a power source (not shown). With this, the seed pulse laser beam L0 from the $CO_2$ gas amplification part 702 may be transmitted through the polarization beam splitter 701 and then be subjected to the quarter-wave phase shift when passing through the Pockels cell 706, to which the predetermined voltage is applied. Thereafter, the seed pulse laser beam L0 may be reflected by the resonator mirror 707 and pass through the Pockels cell 706, to thereby be subjected to the quarter-wave phase shift. Then, the seed pulse laser beam L0 may be incident on the polarization beam splitter 701 mostly as the S-polarization component and be reflected by the polarization beam splitter 701. The reflected component of the seed pulse laser beam L0 may then be outputted from the regenerative amplifier 317 as a seed pulse laser beam L0a.

8.3 Beam Path Adjusting Unit

Figure 31:
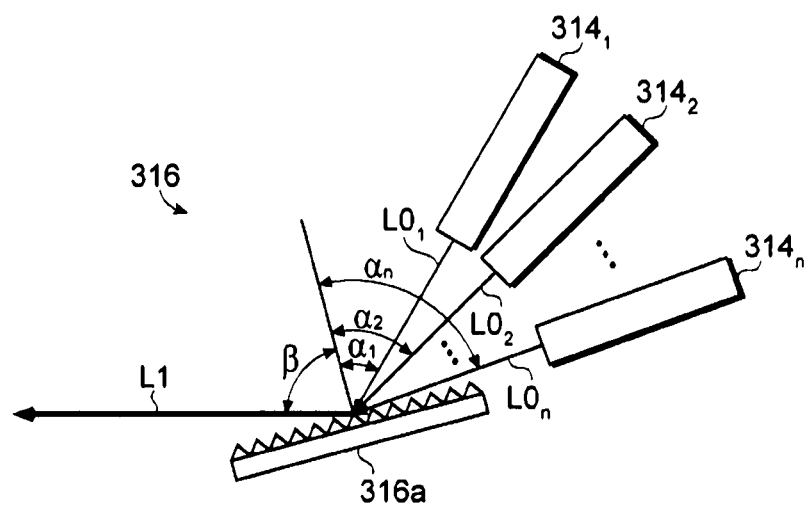
FIG. 31 shows a beam path adjusting unit in one or more of the embodiments in this disclosure and an example of the arrangement of master oscillators with respect to the beam path adjusting unit.

The beam path adjusting unit 316 will now be discussed in more detail. FIG. 31 shows the beam path adjusting unit 316 and an example of the arrangement of master oscillators $314_1$ through $314_n$ with respect to the beam path adjusting unit 316. In FIG. 31, the optical shutters $342_1$ through $342_n$ are not depicted to simplify the drawing.

As illustrated in FIG. 31, the beam path adjusting unit 316 may include a reflective grating 316a. The master oscillators $314_1$ through $314_n$ may be positioned with respect to the grating 316a such that diffracted rays of the same order (e.g., −1st order) of the respective pulse laser beams $L0_1$ through $L0_n$ from the respective master oscillators $314_1$ through $314_n$ are outputted at the same angle β in the same direction. Here, the master oscillators $314_1$ through $314_n$ may be positioned with respect to the grating 316a so as to satisfy Expression (7) below. In Expression (7), $\lambda_1$ through $\lambda_n$ are the central wavelengths of the respective pulse laser beam $L0_1$ through $L0_n$, β is a diffraction angle, and $\alpha_1$ through $\alpha_n$ are incident angles of the respective pulse laser beam $L0_1$ through $L0_n$.

$$Nm\lambda_1 = \sin\beta \pm \sin\alpha_1$$
$$Nm\lambda_2 = \sin\beta \pm \sin\alpha_2$$
$$\ldots$$
$$Nm\lambda_n = \sin\beta \pm \sin\alpha_n \qquad (7)$$

By positioning the master oscillators $314_1$ through $314_n$ with respect to the reflective grating 316a in the above-described manner, the beam paths of the seed pulse laser beams $L0_1$ through $L0_n$ may be made to coincide with one another with ease through a compact optical element (i.e., grating 316a). In this example, the reflective grating 316a is used. However, a transmissive grating may be used instead of the reflective grating 316a.

8.4 Multi-line Amplification

Figure 32:
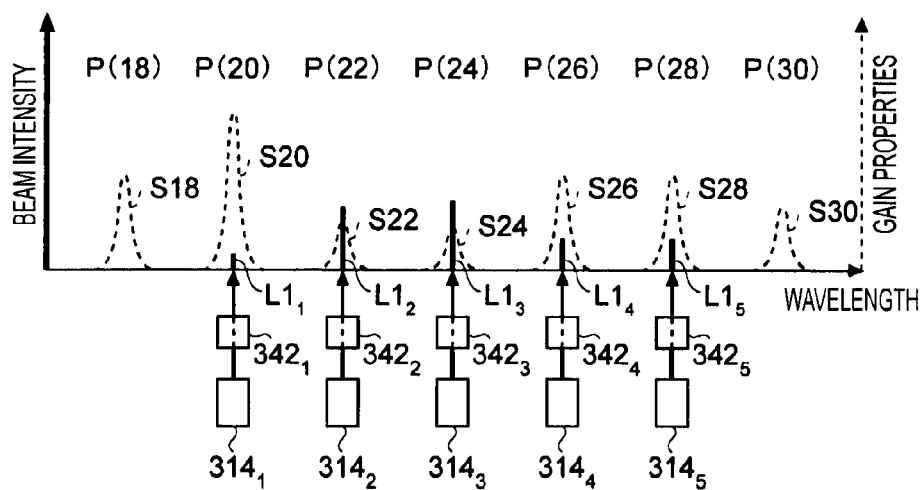
FIG. 32 shows an example of the relationship between the gain properties of each amplification line in an amplifier and pulse energy of each pulse laser beam to be transmitted through a corresponding optical shutter.
Figure 33:
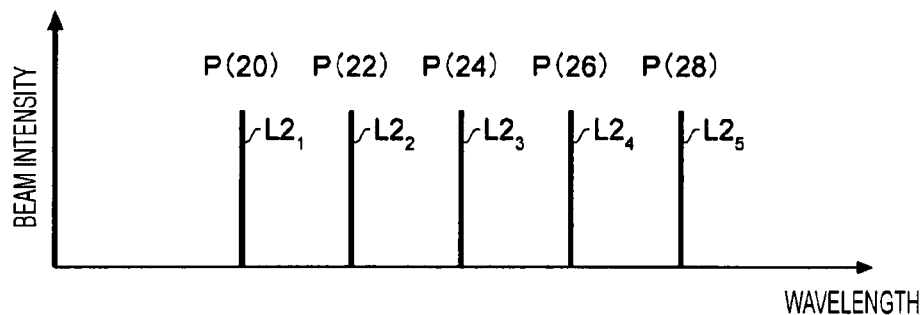
FIG. 33 shows the pulse energy of each pulse laser beam amplified in accordance with the gain properties shown in FIG. 32.

The multi-line amplification by the amplification unit 320 will now be discussed. FIG. 32 shows an example of the relationship between the gain properties S18 through S30 of respective amplification lines P(18) through P(30) in the amplification unit 320 and the pulse energy of pulse laser beams $L1_1$ through $L1_5$ to be transmitted through the corresponding optical shutters $342_1$ through $342_5$. FIG. 33 shows the pulse energy of amplified pulse laser beams $L2_1$ through $L2_n$.

As shown in FIG. 32, the transmittance of the optical shutters $342_1$ through $342_5$ may be adjusted in accordance with the gain properties S18 through S30 of the respective amplification lines P(18) through P(30). In that case, as shown in FIG. 33, the pulse energy of the pulse laser beams $L2_1$ through $L2_5$ amplified in the respective amplification lines P(20) through P(28) may be substantially equal to one another. In the case shown in FIGS. 32 and 33, five master oscillators $314_1$ through $314_5$ and corresponding five optical shutters $342_1$ through $342_5$ may be used. This disclosure, however, is not limited thereto, and various modifications can be made in addition or alternatively to those described herein.

Adjusting the pulse energy of the pulse laser beams $L1_1$ through $L1_n$ by controlling the transmittance of the optical shutters $342_1$ through $342_n$ may make it possible to control the pulse energy of the pulse laser beams $L2_1$ through $L2_n$. As a result, the pulse energy of the pulse laser beam 31 outputted from the laser apparatus 3C (see FIG. 15) may be adjusted to a desired value (e.g., a value requested in the energy instruction value Pt).

Here, carrying out the pulse-to-pulse energy control using primarily the amplification line P(20), which has a relatively high power conversion efficiency, may lead to energy savings.

Figure 34:
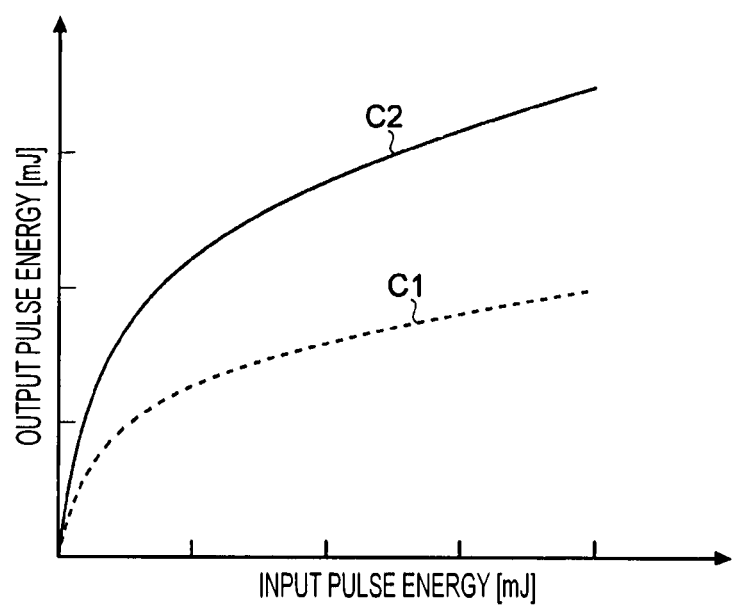
FIG. 34 shows an example of the gain efficiency in multi-line amplification and single-line amplification.

FIG. 34 shows the gain efficiency in the multi-line amplification and the single-line amplification using the amplification unit 320. In FIG. 34, a line C1 shows the gain efficiency in a case of the single-line amplification using the amplification line P(20). A line C2 shows the gain efficiency in a case of the multi-line amplification using the amplification lines P(20) through P(28).

As may be apparent from the comparison between the lines C1 and C2 in FIG. 34, the multi-line amplification can yield approximately 1.5 times more output pulse energy than the single-line amplification. This suggests that the multi-line amplification can yield a dynamic range which is 1.5 times wider than a dynamic range in the case of the single-line amplification. Here, the output pulse energy in FIG. 34 is the pulse energy of the pulse laser beam 31 outputted from the laser apparatus 3C.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A laser apparatus, comprising:
a seed laser device configured to output a pulse laser beam;
a pulse energy adjusting unit configured to vary pulse energy of the pulse laser beam;
at least one amplifier for amplifying the pulse laser beam;
at least one power source for varying an excitation intensity in the at least one amplifier; and
a controller configured to control the pulse energy adjusting unit on a pulse-to-pulse basis for the pulse laser beam passing therethrough and to control the at least one power source for a group of multiple pulses of the pulse laser beam, wherein
the pulse energy adjusting unit includes an optical shutter,
the controller is configured to control transmittance of the optical shutter on a pulse-to-pulse basis for the pulse laser beam,
the seed laser device includes a master oscillator, and
the optical shutter is provided inside the master oscillator.

2. The laser apparatus according to claim 1, further comprising an energy monitor provided downstream from the at least one amplifier, wherein the controller is configured to control the pulse energy adjusting unit on a pulse-to-pulse basis for the pulse laser beam based on a target value of the pulse energy received from an external device and a detected value by the energy monitor.

3. The laser apparatus according to claim 1, further comprising an energy monitor provided downstream from the at least one amplifier, wherein the controller is configured to control the at least one power source for a group of multiple pulses of the pulse laser beam based on a target value of the pulse energy received from an external device and a detected value by the energy monitor.

4. The laser apparatus according to claim 3, wherein the controller is configured to control the pulse energy adjusting unit on a pulse-to-pulse basis for the pulse laser beam based on the target value and the detected value.

5. The laser apparatus according to claim 1, wherein
the seed laser device includes a master oscillator, and
the optical shutter is provided downstream from the master oscillator.

6. The laser apparatus according to claim 1, wherein
the seed laser device includes a master oscillator and a regenerative amplifier,
the optical shutter is provided downstream from the regenerative amplifier, and
the controller is configured to control transmittance of the optical shutter on a pulse-to-pulse basis for the pulse laser beam.

7. The laser apparatus according to claim 1, wherein the optical shutter includes an electro-optic device, a first optical filter provided at an input end of the electro-optic device, a second optical filter provided at an output end of the electro-optic device, and a power source connected to the electro-optic device so as to apply a voltage to the electro-optic device.

8. The laser apparatus according to claim 7, wherein the electro-optic device is a Pockels cell.

9. The laser apparatus according to claim 7, wherein each of the first and second optical filters includes at least one polarizer.

10. A laser apparatus, comprising:
a seed laser device configured to output a pulse laser beam;
a pulse energy adjusting unit configured to vary pulse energy of the pulse laser beam;
at least one amplifier for amplifying the pulse laser beam;
at least one power source for varying an excitation intensity in the at least one amplifier; and
a controller configured to control the pulse energy adjusting unit on a pulse-to-pulse basis for the pulse laser beam passing therethrough and to control the at least one power source for a group of multiple pulses of the pulse laser beam, wherein
the seed laser device includes a plurality of master oscillators each configured to output a pulse laser beam, and a beam path adjusting unit for making beam paths of the pulse laser beams from the plurality of master oscillators coincide with one another,
the pulse energy adjusting unit includes a plurality of optical shutters each provided downstream from the respective master oscillators, and
the controller is configured to control transmittance of the plurality of optical shutters on a pulse-to-pulse basis for the pulse laser beams.

11. The laser apparatus according to claim 1, wherein the at least one amplifier includes a carbon dioxide gas as a gain medium.

12. An extreme ultraviolet light generation system, comprising:
a laser apparatus including a seed laser device configured to output a pulse laser beam, a pulse energy adjusting unit configured to vary pulse energy of the pulse laser beam, at least one amplifier for amplifying the pulse laser beam, at least one power source for varying an excitation intensity in the at least one amplifier, and a controller configured to control the pulse energy adjusting unit on a pulse-to-pulse basis for the pulse laser beam passing therethrough and to control the at least one power source for a group of multiple pulses of the pulse laser beam;
a chamber;
a target supply unit mounted on the chamber and configured to supply a target material into the chamber; and
a focusing optical element for focusing a pulse laser beam from the laser apparatus in a predetermined region inside the chamber, wherein
the pulse energy adjusting unit includes an optical shutter,
the controller is configured to control transmittance of the optical shutter on a pulse-to-pulse basis for the pulse laser beam,
the seed laser device includes a master oscillator, and
the optical shutter is provided inside the master oscillator.

13. A method for generating a laser beam in a laser apparatus which includes a seed laser device, a pulse energy adjusting unit, at least one amplifier, and at least one power source, the method comprising:
controlling the pulse energy adjusting unit configured to vary pulse energy of a pulse laser beam on a pulse-to-pulse basis for the pulse laser beam from the seed laser device; and controlling the at least one power source configured to vary an excitation intensity in the at least one amplifier for a group of multiple pulses of the pulse laser beam, wherein the pulse energy adjusting unit includes an optical shutter, the controlling step includes controlling transmittance of the optical shutter on a pulse-to-pulse basis for the pulse laser beam, the seed laser device includes a master oscillator, and the optical shutter is provided inside the master oscillator.

* * * * *